United States Patent
Bellows et al.

(10) Patent No.: US 8,516,461 B2
(45) Date of Patent: *Aug. 20, 2013

(54) METHOD TO DYNAMICALLY DISTRIBUTE A MULTI-DIMENSIONAL WORK SET ACROSS A MULTI-CORE SYSTEM

(75) Inventors: Gregory Howard Bellows, Austin, TX (US); Brian H. Horton, Pflugerville, TX (US); Joaquin Madruga, Round Rock, TX (US); Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,211

(22) Filed: Sep. 15, 2012

(65) Prior Publication Data

US 2013/0013897 A1    Jan. 10, 2013

Related U.S. Application Data

(63) Continuation of application No. 12/649,652, filed on Dec. 30, 2009.

(51) Int. Cl.
*G06F 9/45* (2006.01)
*G06F 15/00* (2006.01)

(52) U.S. Cl.
USPC ............................................. 717/149; 712/10

(58) Field of Classification Search
USPC .................. 717/140–149; 712/10, 28; 710/5
See application file for complete search history.

(56) References Cited

U.S. PATENT DOCUMENTS

| | | | |
|---|---|---|---|
| 5,752,036 A * | 5/1998 | Nakamura et al. | 717/149 |
| 6,076,154 A * | 6/2000 | Van Eijndhoven et al. | 712/24 |
| 8,250,548 B2 * | 8/2012 | Kasahara et al. | 717/149 |
| 2003/0106049 A1 * | 6/2003 | Ungar | 717/143 |
| 2007/0283358 A1 * | 12/2007 | Kasahara et al. | 718/104 |
| 2008/0301656 A1 * | 12/2008 | Archambault et al. | 717/157 |

* cited by examiner

*Primary Examiner* — Christopher Shin
(74) *Attorney, Agent, or Firm* — Yudell Isidore Ng Russell PLLC

(57) ABSTRACT

A method provides efficient dispatch/completion of an N Dimensional (ND) Range command in a data processing system (DPS). The method comprises: a compiler generating one or more commands from received program instructions; ND Range work processing (WP) logic determining when a command generated by the compiler will be implemented over an ND configuration of operands, where N is greater than one (1); automatically decomposing the ND configuration of operands into a one (1) dimension (1D) work element comprising P sequentially ordered work items that each represent one of the operands; placing the 1D work element within a command queue of the DPS; enabling sequential dispatching of 1D work items in ordered sequence from to one or more processing units; and generating an ND Range output by mapping the 1D work output result to an ND position corresponding to an original location of the operand represented by the 1D work item.

9 Claims, 26 Drawing Sheets

| GLOBAL/COMMON CMD QUEUE 320 | | | | |
|---|---|---|---|---|
| NO RANGE WORK ELEMENTS 325 | SEEN CNTR 627 | WIR CNTR 629 | MASK BITS 330 | ATTR 631 |
| WE_R | NCU | NWI | nnnNNN | AI..AN |
| ... | ... | ... | ... | ... |
| WE_2 | 48 | 2000 | 0011010111 | AI..AN |
| WE_1 | 7 | 100 | 1011010111 | AI..AN |
| WE_0 | 4 | 16 | 1001010100 | AI..AN |

*FIG. 6A*

| GLOBAL/COMMON CMD QUEUE 320 | | | | |
|---|---|---|---|---|
| NO RANGE WORK ELEMENTS 325 | SEEN CNTR 627 | WIR CNTR 629 | MASK BITS 330 | ATTR 331 |
| WE_R | NCU | NWI | nnnNNN | AI..AN |
| ... | ... | ... | ... | ... |
| WE_2 | 48 | 2000 | 0011010111 | AI..AN |
| WE_1 | 7 | 100 | 1011010111 | AI..AN |
| WE_0 | 4 | 12 | 1001010100 | AI..AN |

*FIG. 6B*

GLOBAL/COMMON CMD QUEUE
320

| ND RANGE WORK ELEMENTS 325 | SEEN CNTR 627 | WIR CNTR 629 | MASK BITS 330 | ATTR 631 |
|---|---|---|---|---|
| WE_R | NCU | NWI | nnnNNN | A1..AN |
| ... | ... | ... | ... | ... |
| WE_2 | 48 | 2000 | 0011010111 | A1..AN |
| WE_1 | 7 | 100 | 1011010111 | A1..AN |
| WE_0 | 3 | 0 | 1001010100 | A1..AN |

*FIG. 6C*

GLOBAL/COMMON CMD QUEUE
320

| ND RANGE WORK ELEMENTS 325 | SEEN CNTR 627 | WIR CNTR 629 | MASK BITS 330 | ATTR 631 |
|---|---|---|---|---|
| WE_R | NCU | NWI | nnnNNN | A1..AN |
| ... | ... | ... | ... | ... |
| WE_2 | 48 | 2000 | 0011010111 | A1..AN |
| WE_1 | 7 | 90 | 1011010111 | A1..AN |
| WE_0 | 1 | 0 | 1001010100 | A1..AN |

*FIG. 6D*

| GLOBAL/COMMON CMD QUEUE 220 | | | | |
|---|---|---|---|---|
| ND RANGE WORK ELEMENTS 325 | SEEN CNTR 627 | WIR CNTR 629 | MASK BITS 330 | ATTR 631 |
| WE_R | NCU | NWI | nnnNNN | A1..AN |
| ⋮ | ⋮ | ⋮ | ⋮ | ⋮ |
| WE_2 | 48 | 2000 | 0011010111 | A1..AN |
| WE_1 | 6 | 90 | 1011010111 | A1..AN |
| WE_0 | 3 | 0 | 1001010100 | A1..AN |

*FIG. 6E*

| GLOBAL/COMMON CMD QUEUE 220 | | | | |
|---|---|---|---|---|
| ND RANGE WORK ELEMENTS 325 | SEEN CNTR 627 | WIR CNTR 629 | MASK BITS 330 | ATTR 631 |
| WE_R | NCU | NWI | nnnNNN | A1..AN |
| ⋮ | ⋮ | ⋮ | ⋮ | ⋮ |
| WE_2 | 48 | 2000 | 0011010111 | A1..AN |
| WE_1 | 4 | 50 | 1011010111 | A1..AN |
| WE_0 | 1 | 0 | 1001010100 | A1..AN |

*FIG. 6F*

METHOD TO DYNAMICALLY DISTRIBUTE A MULTI-DIMENSIONAL WORK SET ACROSS A MULTI-CORE SYSTEM

PRIORITY CLAIM

The present application is a continuation of and claims priority from U.S. patent application Ser. No. 12/649,652, filed on Dec. 30, 2009, titled "Method to Dynamically Distribute a Multi-Dimensional Work Set Across a Multi-Core System," which is incorporated by reference herein in its entirety and for all purposes.

BACKGROUND

1. Technical Field

The present invention generally relates to multi-processor data processing systems and in particular to operations on data processing systems configured with multiple processing units. Still more particularly, the present invention relates to a method and system for completing parallel processing of distributed work across multiple processing units of a multi-core data processing system.

2. Description of the Related Art

Advanced computing processes enable the completion of work as a multi-dimension work set. For example, in computing standards designed for executing operations on two or three dimensional objects (e.g., OpenCL™), an N Dimensional (ND) Range command is provided that enables the multi-dimensional work set to be scheduled using an index space that equals the N dimensions, where the work is then iterated over that N dimensional space. With these convention methods for completing work across a multi-dimensional space, there are built in complexities that make it very difficult to efficiently schedule work and/or efficiently communicate which work (across the multiple dimensions) is scheduled and completed.

SUMMARY OF ILLUSTRATIVE EMBODIMENTS

Disclosed is a method for efficient dispatch/completion of an N Dimensional (ND) Range command in a data processing system. The method implementation comprises: a compiler generating one or more commands from received program instructions, wherein said one or more commands are utilized by a runtime scheduler to schedule work for execution on one or more processing units within the data processing system; ND Range work processing (WP) logic associated with the compiler determining when a command generated by the compiler will be implemented over an ND Range of operands that are arranged in an N dimensional configuration, where N is greater than one (1); when N is greater than one (1), automatically decomposing the ND Range of operands into a one (1) dimension work element comprising P sequentially ordered work items that each represent, within the one dimensional work element, one of the ND Range of operands; placing the single dimension work element within one or more entries of a command queue of the data processing system, wherein each of the one or more entries holds a 1D array of work items in an ordered sequence; enabling sequential dispatch of the 1D array of work items from the command queue to the one or more processing units, wherein the 1D array of work items are dispatched for execution in the ordered sequence; and generating an ND Range output by mapping single dimension work output result to an ND position corresponding to an original location of the ND Range operand represented by the single dimension work item.

The above summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The claimed subject matter and equivalents thereof will best be understood by reference to the following detailed description of illustrative embodiments when read in conjunction with the accompanying figures, wherein:

FIGS. 6A-6F provides a sequence of block diagrams representing an example global command queue with APU mask and illustrating modifications to count variables within the global command queue as work items are retrieved from a work element for processing by one or more pre-selected processor cores, in accordance with one embodiment;

DETAILED DESCRIPTION

Figure 1:
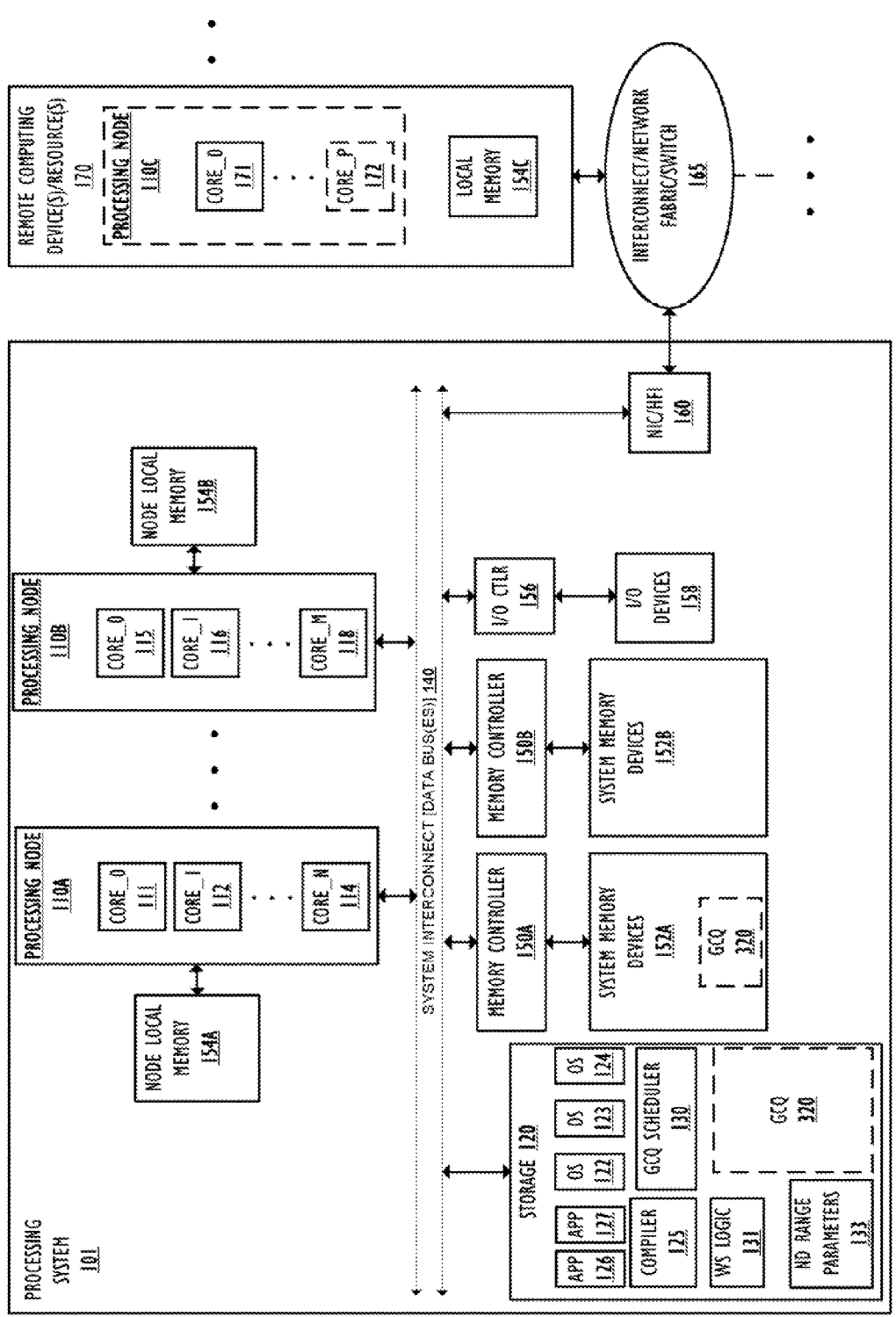
FIG. 1 illustrates an example multi-node, distributed data processing system architecture with multiple nodes each having multiple processor cores and local memory, within which features of one or more of the described embodiments may be implemented.

The illustrative embodiments provide a method, multi-node, multi-core system architecture, and computer program product or article of manufacture that enables efficient dispatch/completion of an N Dimensional (ND) Range command in a data processing system (DPS). The method implementation comprises, among other steps: a compiler generating one or more commands from received program instructions; ND Range work processing (WP) logic determining when a command generated by the compiler will be implemented over an ND configuration of operands, where N is greater than one (1); automatically decomposing the ND configuration of operands into a one (1) dimension (1D) work element comprising P sequentially ordered work items that each represent one of the operands; placing the 1D work element within a command queue of the DPS; enabling sequential dispatching of 1D work items in ordered sequence from to one or more processing units; and generating an ND Range output by mapping the 1D work output result to an ND position corresponding to an original location of the operand represented by the 1D work item.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the following terms, which are utilized herein, are defined as follows:

(1) Approved Processing Units (APU): processor cores that have a bit mask represented (i.e., set to 1) in a global bit mask (APU mask) linked to a specific work element within the global command queue (GCQ). The APUs are the processor cores among all processor cores in the overall system that are allowed to process work from a particular work set within the global command queue.

(2) Kernel/Work Element: a combination of a function to be executed and the number of times to execute the function over a particular set of input data. Each execution of the function on a unique data is referred to herein as a "work item", and each work element is assumed to comprise multiple work items which can be executed across multiple different processing nodes by multiple different processing units.

(3) Work Item: a base element of a data set (e.g., a byte, a string, an integer number, an floating point number, a pixel, an array, a data structure, etc.).

(4) Work Group: a group of work items, which group is referred to herein as a "work element" when placed in a single entry of a global command queue.

(5) ND Range Size: a number of work items in an index space.

(6) Work Group Size: a number of work items in a work group, where the number divides into a ND Range Size without a remainder.

(7) Kernel: a function that processes a work item to produce a result, where the function is implemented by one or more instructions executable by a processor core.

(8) Kernel Object: a kernel and argument(s) to use when executing the kernel.

(9) Work Item Remaining (WIR) Counter: a counter that tracks the number of work items within a work element and which is decremented each time one or more work items are removed by a processor core. The amount of the decrement is equal to the number of work items removed by the processor core, and the counter is decremented until the counter value reaches or goes below zero.

(10) Seen Counter: a counter which tracks the number of approved processing units that have seen/queried the work element for work. The seen counter is initially set to the total number of APUs that are assigned to the work element, and the counter is subsequently decremented each time a different one of the APUs checks the work element for work while the WIR Counter value is at or below zero. A work element is removed from the GCQ whenever the Seen Counter reaches zero.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa.

A. System Architecture

As provided herein, the invention is applicable to any number of different configurations of such multi-core systems, including ones configured as large scale parallel processing system, or ones configured as non-uniform memory access (NUMA) processing system, or other type of multi-core processing system, including parallel processing systems. The descriptions provided herein assume no specific architecture, other than a multi-core architecture. However, certain features are assumed implemented in multi-node architectures (i.e., system with multiple processing nodes) in which one or more processing nodes exhibit low latency when accessing a global/shared memory structure, while other features are assumed to be implemented in multi-node architectures in which one or more processing nodes exhibit high latency when accessing the global/shared memory structure.

As further described below, implementation of the functional features of the invention is provided within processing nodes and involves use of a combination of hardware, firmware, as well as several software-level constructs. The presented figures illustrate both hardware and software components within an example distributed, multi-node computing environment in which multiple physically separate processing nodes, interconnected via a general system interconnect and/or a network interface device (NID) and/or host fabric interface (HFI) and/or one or more other forms of interconnects (e.g., switches, and the like), provide a distributed data processing system that executes one or more ND work sets via a plurality of processor cores. The illustrative and described embodiments assume that the system architecture may be scaled to a much larger number of processing nodes.

Turning now to the figures, and in particular to FIG. 1, which illustrates an example multi-node, distributed Data Processing System (DPS) architecture within which the described embodiments may be advantageously implemented. As shown, DPS architecture 100 comprises a local processing system 101, which is coupled to a remove computing device 170 via an interconnect 165, such as a network fabric or switch. Local processing node 101 comprises a plurality of processing nodes of which processing node0 110A and processing nodeN 110B are illustrated. Processing node0 110A and processing nodeN 110B are coupled to system interconnect 140, which serves as and may interchangeably be referred to as data buses.

System interconnect 140 provides connectivity within processing system 101 to various devices, including but not limited to, memory controllers 150A, 150B and input/output (I/O) controller 156. Network controllers 150A, 150B controls access to respective system memory devices 152A, 152B. Depending on system design, memory controllers 150A, 150B may be assigned to respective processing nodes 110A or 110B, and/or may be physically located on the processor chip or at some other location within the overall system architecture. It is appreciated that the presence of multiple memory controllers 150A, 150B is a design parameter, and that the local processing system 101 may be configured with a single memory controller in an alternate embodiment. In one embodiment, I/O controller 156 provides control over/by one or more I/O devices 158, such as a pointing device, display monitor, and the like.

In addition to system memory devices 152A, 152B of the overall system, each processing node 110A and 110B has an associated node local memory 154A, 154B, which allows for staging of work at the processing node without requiring the processing node to have to retrieve each piece of work individually from the system memory 152A, 152B or other remote (or high latency) location. Each processing node 110A, 110B has a plurality of processor cores, although it is possible for the nodes to be single core nodes. As shown, processor node 110A comprises N+1 cores, numbered core_0 though core_N, where N is an integer greater than zero. Likewise, processor node 110B comprises M+1 cores, numbered core_0 though core_M, where M is an integer greater than zero. So as to simplify the description of the embodiments, both N and M are assumed to be integer three (3), such that processing node 110A has four (4) processor cores 111-114 and processing node 110B has four (4) processor cores 115-119. Where utilized herein, the term processing units are assumed to be synonymous with processor cores.

The use of the integer variables "N" and "M" to cap the number of processor cores in respective processing nodes 110A and 110B merely indicates that each processing node can include a variable number of separate processor cores, with N and M being integers of any size greater than 0 (assuming a multi-core implementation for respective processing nodes). The number of processing nodes deployed in a given system architecture is implementation-dependent and can vary widely. It is appreciated that the embodiments described herein enables scaling to a much larger number of processing nodes and even larger number of processor cores. Within the described embodiments, local processing system 101 is assumed to be the source of the ND Range work set that is generated and processed by the processor cores within DPS architecture 100.

As further illustrated, local processing system 101 also includes storage 120, within which are stored several of the firmware and software components that enable generation of work and ND Range work sets for execution by one or more of the processing units. Provided within storage 120 are several operating systems (OSes) 122-124, applications 126-

127, compiler 125, GCQ scheduler 130, ND Range Work Scheduling (WS) logic 131, and ND range parameters 133 (which may also be stored in system memory 152). In one embodiment, GCQ scheduler 130 is logic that is executed by a processing unit to receive work kernels from a compiler and schedule the work for dispatch to/by one or more of the multiple processor cores within the DPS architecture 100. In one embodiment, the work set that is operated on is retrieved by compiler 125 from one or more of applications 125-126 and/or OSes 122-124, or from some other source (not illustrated herein). Further, local processing system 101 includes global command queue (GCQ) 320, which may be stored in storage 120 or within system memory 152A. Local storage of GCQ 320 enables low latency access to GCQ by processor cores, such as cores 0-N and 0-M, when these processor cores are looking for work to complete. In one embodiment, compiler 125 includes a just in time (JIT) compiler that produces one or more kernels in accordance with a method or process associated with processing work. For example, application 126 can implement a method or process associated with processing work, and in response to an execution of application 126, the JIT compiler can produce one or more kernels to process a data set or work. While generally illustrated as software implemented components, the functionality of the GCQ logic, WS logic, compiler, and other functional logic generally described herein (e.g., LCQ logic) may be implemented as hardware or a combination of hardware and software, in some embodiments.

Local processing system 101 includes or is coupled to a switch or other global interconnect (e.g., interconnect 165) to which multiple other processing nodes may be connected. As illustrated, local processing system 101 is communicatively connected to remote computing device 170 via interconnect 165, which may be a network fabric or switch. Connection to interconnect 165 is provided via network interface controller (NIC) 160, which may be a host fabric interface (HFI). Interconnect 165 may be a single general interconnect to which all nodes connect or may comprise one or more subnets (not shown) connecting a subset of processing nodes to each other and/or to local processing system 101, in one of several alternate configurations.

Remote computing device 170 provides additional computing resources within DPS architecture 100, such as remote processing node 110C and associated local memory 154C. Remote processing node 110C comprises at least one processor core, of which core0 171 is provided. Where processing node 110C is a multi-core processing node, processing node 110C may comprise P+1 cores, of which core_P 172 is illustrated. With this multi-core configuration, "P" is an integer greater than or equal to one. For purposes of describing the illustrative embodiments, P is assumed to be one (1), such that processing node 110C has two (2) processing cores. Also, because of the relative distance between remote computing device 170 and specifically processing node 110C from the work staging area within local processing system 101, core_0 171 and core_P 172 are described in some embodiments as cores exhibiting high latency during shared work retrieval and/or balancing, as will become clearly in the descriptions which follow.

The illustrated configuration of multi-node DPS architecture multiple processing nodes is presented herein for illustrative purposes only. The functional features of the embodiments described herein therefore apply to different configurations of data processing systems. Those skilled in the art will appreciate that DPS architecture 100 of FIG. 1 can include many additional components, such as interconnect bridges, ports for connection to networks or attached devices, and the like (none of which are illustrated herein). Because such additional components are not necessary for an understanding of the present invention, they are not illustrated in FIG. 1 or discussed further herein.

B. Architecture for Low Latency Work Retrieval by Processing Units

Certain of the features of the described embodiments may lend themselves to N Dimensional (ND) Range processing/execution paradigms, such as provided by OpenCL™ and similarly structured applications executed on multi-core data processing systems in which an execution command contains the information necessary to efficiently execute and balance work load of the command, which may include data or task parallel processing requirements. Each command includes information corresponding to the total number of work groups within the command to be executed. The compiler of the processing system receives the command and generates kernels of work, which are scheduled on one or more of the available processor cores of the processing system. With a conventional multi-node processing system, the scheduling of work items associated with each kernel may be completed as entire work groups, utilizing local node queues as illustrated by FIG. 2.

Figure 2:
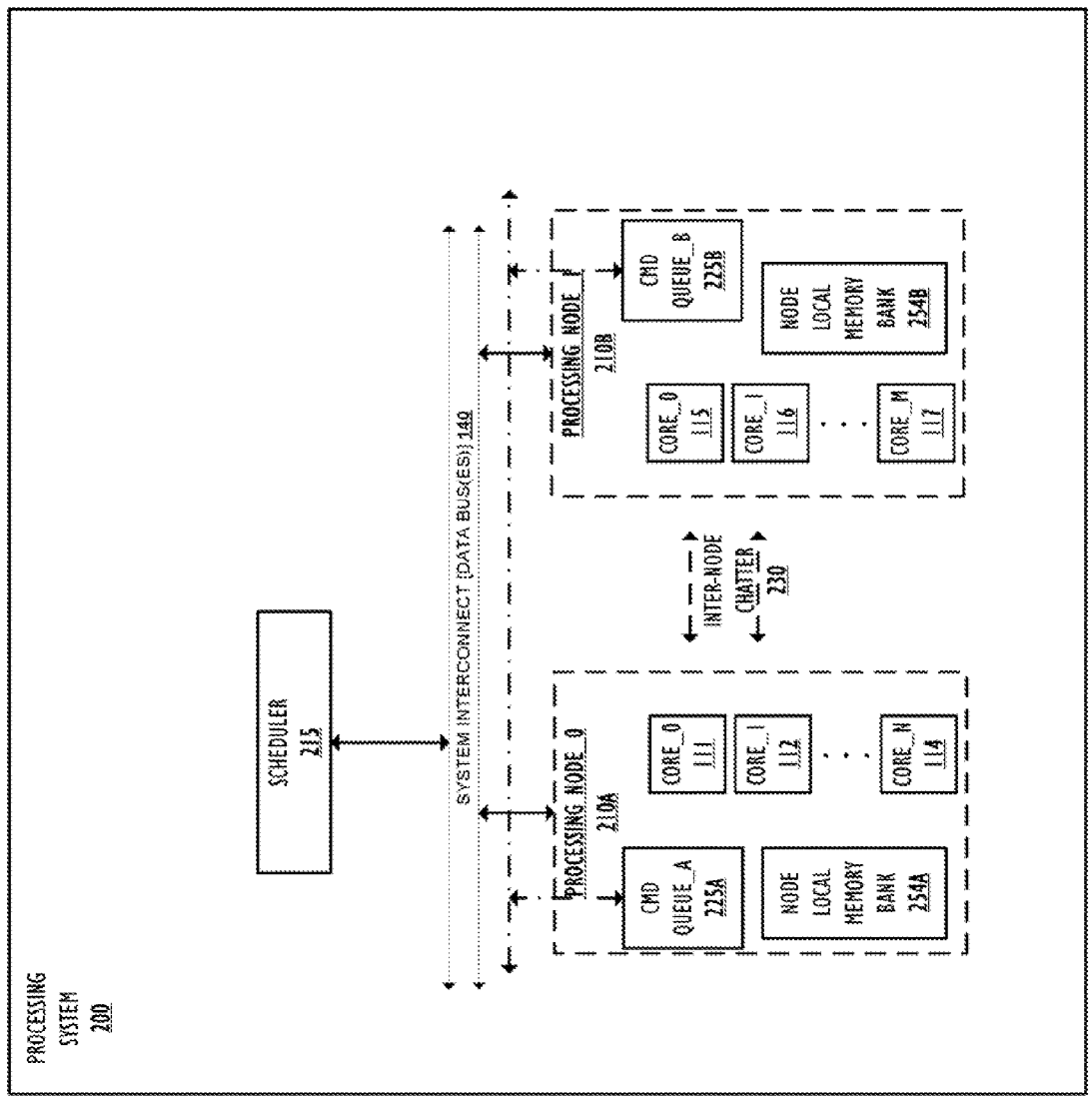
FIG. 2 illustrates a prior art implementation of a non-uniform memory access (NUMA) system with two processing nodes having local work queues of pre-distributed portions of work, which are periodically re-balanced using a work queue re-balancing algorithm.

FIG. 2 thus illustrates a conventional configuration of a multi-node processing system 200 in which work generated by a command is executed by processor cores on different processing nodes 210A, 210B by dividing the data set into work groups and arbitrarily and statically assigning the work groups to separate, structured command queues (i.e., pre-set sized queues) that are physically located within each node. As shown, processing node 210A includes command queue 225A, while processing node 210B includes command queue 225B. Scheduler 215 assigns different portions of the entire work, perhaps based on memory affinity of the addressing scheme of node local memory 254A, 254B relative to the data elements within the work, without full consideration for load balancing across the nodes. To complete the dispatch of work and account for dependencies, etc. the nodes have to communicate with each other and may have to move work around the different command queues. There is considerable amount of cross chatter between the nodes to provide coordination with each other as the work is being performed out of their respective local command queues. This configuration leads to work contention over the system interconnect 140 as the processing cores operate at different speeds and often have to rebalance the work load amongst the nodes, leading to substantial amounts of inter-node chatter 230 as the nodes attempt to move work around between the different work queues (225A, 225B).

Figure 3:
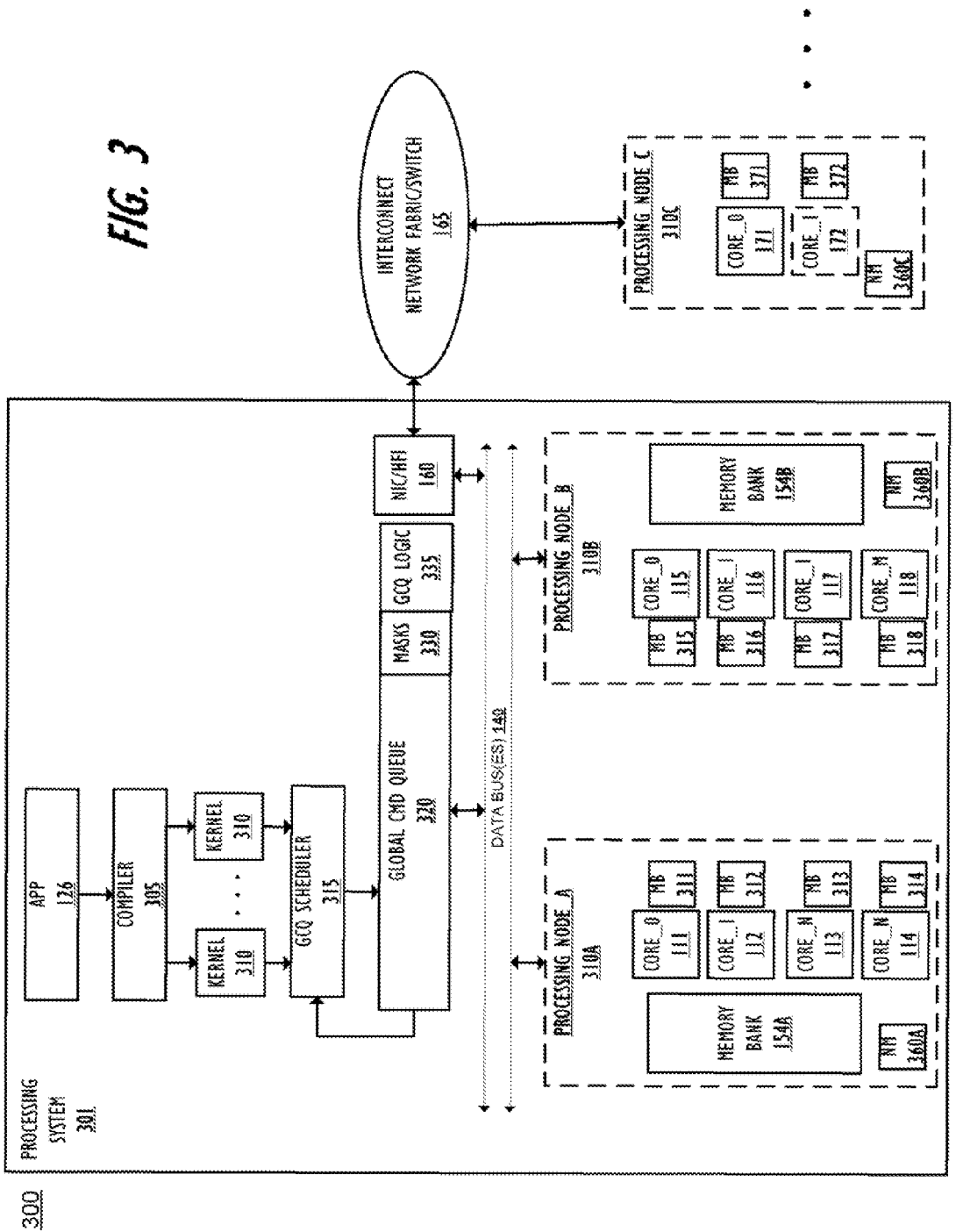
FIG. 3 illustrates a first example of a multi-core, multi-node processing system configured with a shared global command queue (GCQ) having an Approved Processor Units (APU) mask associated with each work entry and processor unit (PU) masks associated with each processor core to enable selective retrieval of work by approved processor cores within the system, in accordance with one embodiment.

With reference now to FIG. 3, there is provided one embodiment of a multi-node processing system architecture 300, which includes software and hardware constructs to allow for effective and efficient work allocation to and completion by processing nodes and specifically processor cores (on these processing nodes) when the processor cores exhibit low latency communication with system memory of local processing system 300 on which the work is being dispatched. In addition to the hardware structure presented in system architecture (100) of FIG. 1, which have been previously described, FIG. 3 provides a different configuration and functionality of several of the software and firmware components introduced in FIG. 1 as well as two new constructs, which together enable the functional features of the described embodiments.

Multi-node processing system architecture 300 is illustrated with three processing nodes, processing node A 310A and processing node B 310B, each having four (4) processor cores (nodeA cores 111-114 and nodeB cores 115-118) and processing node C, with two processor cores (nodeC cores 171-172). Each processing core within system architecture 300 (namely processing cores 111-114, processing cores 115-118, and processing cores 171-172) is provided a unique bit mask identifier (MB), which is associated/linked/encoded with each processor core and uniquely identifies the specific processor core from other processor cores within the overall system architecture 300. Thus, for example, core0 111 is tagged with first bit mask (MB) 311, core 1 112 is tagged with second bit mask 312, coreN 114 is tagged with fourth bit mask 314, core2 116 is tagged with sixth bit mask 316, and so on. For simplicity, the bit masks are referred to herein as processing unit (PU) mask, such that each processing unit/processor core has a unique mask identifier. Example PU masks as well as their functionality are provided in FIG. 4, which is described below. In one embodiment, each processor node (310A, 310B, 310C) is also provide a node-level bit mask, nodeA mask (NM) 360A, nodeB mask 360B, and nodeC mask 360C to enable node level scheduling, as described further below.

Turning now to the functional blocks in the upper portion of the figure, the executable/execution code of example application 126 is forwarded to compiler 305, which processes the instructions/codes to generate commands. These commands provide work divided into work groups, each referred to as kernel 310. The kernels 310 are forwarded to GCQ scheduler 315. GCQ scheduler 315 is an enhanced runtime scheduler that dynamically performs the functions of: (1) scheduling (placing) work elements into a global command queue (GCQ) 320; (2) selective allocating/assigning the work elements to specific selected processor nodes or processing units (cores) from among the entire set of available processor nodes or processing units; generating an APU mask (330) corresponding to the specific selected processor cores allocated/assigned the work element; and appending/linking or otherwise associating the APU mask (330) to the work element by forwarding the APU mask to GCQ 320. The above scheduler functions are performed at runtime, and the work items associated with the command are generated at runtime when the work element is placed in GCQ 320 for dispatch. In one embodiment, the selectively allocating of the work elements to selected processor cores involves and/or is based on a scheduling criteria that takes into account workload allocation and work balancing across the system architecture, processing capabilities of the different types of processing units (e.g., CPU, GPU, SPU), and other factors, which may be pre-programmed by the designer of the GCQ scheduler. The actual scheduling of the work elements at the GCQ then involves dispatching work items from the work element in the GCQ to only the selected specific processing nodes or the processing units, wherein the dispatching is responsive to receipt at the GCQ of work requests from each of the multiple processing nodes or the processing units, The APU mask 320 represents a global bit mask and is a field of 1s and 0s, with the 1s representing the processing units of the node(s) to which the particular work element may be forwarded, and the 0s indicating that a particular processing unit has not been selected to process work for that work element. The actual size of APU mask 320 scales based on the total number of processing nodes and processor cores available for consideration during allocation of work by GCQ scheduler 315. In implementations where the division of work is per processing nodes, rather than at the granularity of processor cores, the APU mask represents a node mask, which is a bit mask identifying the specific processor node. Any processor core at that selected processing node may then consume the work items from the work element.

In one embodiment, scheduler assigns a different APU mask to each work element; However, it is contemplated that multiple work elements of a single command (work) may be provided with the same APU mask, leading to an alternate embodiment in which a single APU mask may be utilized for multiple sequential work elements placed in the GCQ. An example GCQ 320 is provided by FIGS. 6A-6D, which are described below. GCQ 320 may also comprise GCQ logic 335, which enables selective processor core retrieval of work elements and other aspects of the functionality described hereafter.

It is important to note that the types of work being described herein may be work performed on an N Dimensional (ND) Range of data, which work is passed to the compute nodes, via the GCQ as an ND Range work instruction. In an ND Range instruction, an N dimensional range of work is provided for execution in compute nodes by specific/selected ones of the processor cores, as identified by the APU mask. The value of N in the ND Range and hence the number of dimensions is variable and may be any integer value greater than one (1). According to the described embodiments, the ND Range instructions are executed per kernel invocation, which sets the characteristics of the execution. With the described implementation of GCQ 320, the APU mask 330 and other execution properties (and/or attributes of the work element) are attached to the work items themselves.

FIG. 6A illustrates an example GCQ 320, which comprises multiple queue entries, of which three entries are shown with enqueued work elements, WE_0, WE1, and WE_2. As provided by FIG. 6A, in addition to the actual work element, each entry has a number of variables and/or attributes or properties that are associated with (or linked to) the specific work element, and which are stored in one of the pre-established fields of the GCQ entry. The first row of GCQ indicates the nomenclature provided for each field of each of the GCQ entries. Thus each occupied/filled GCQ entry includes the following fields of information: ND Range work element 625; seen counter 627; work items remaining (WIR) counter 629; APU mask 330; and attributes 631. For purposes of description, the last/bottom entry is the first entry in GCQ 320 and holds work element zero (WE_0) with its associated properties, attributes, and/or variables. As provided by the WIR count within WIR counter 629 of GCQ 320, when WE_0 is initially placed within the GCQ entry, WE_0 includes 16 work items within the work set/group generated by compiler 315 (and enqueued within GCQ) that remain to be executed by the selected processing units. Additionally, as indicated by the seen count within seen counter 627, the 16 work items may be executed by four (4) different selected processing units/cores, which have been identified by scheduler prior to placing the work element in the GCQ. The specific selected processor cores are identified by APU mask 320, which is a sequence of bits that provide an ordered identification of which processor cores of the N processor cores within the overall system have been assigned to process the 16 work items within WE_0.

In the described embodiments, the start value of the seen counter is presented as the number of allocated processing units to/on which work items of the specific work element may be dispatched or scheduled. However, in an alternate embodiment, the seen count is initiated with a start value equal to the total number of processing units within the overall system. For example, with system architecture 300 of FIG. 3, assuming all processing nodes and corresponding processing units have been accounted for, the seen count would be initiated with a value of ten (10). With this alternate embodiment, decrementing of the seen count would be triggered for each processor core that goes to the GCQ for work, regardless of whether the processor core was actually one of the selected processor cores approved for dispatching/scheduling work items from the work element. Either embodiment may be implemented; however, the described embodiments assume the former implementation in which only the approved processor cores are accounted for by the seen count and only those approved processor cores trigger a decrementing by the GCQ logic of the seen count for the particular work element.

Figure 4:
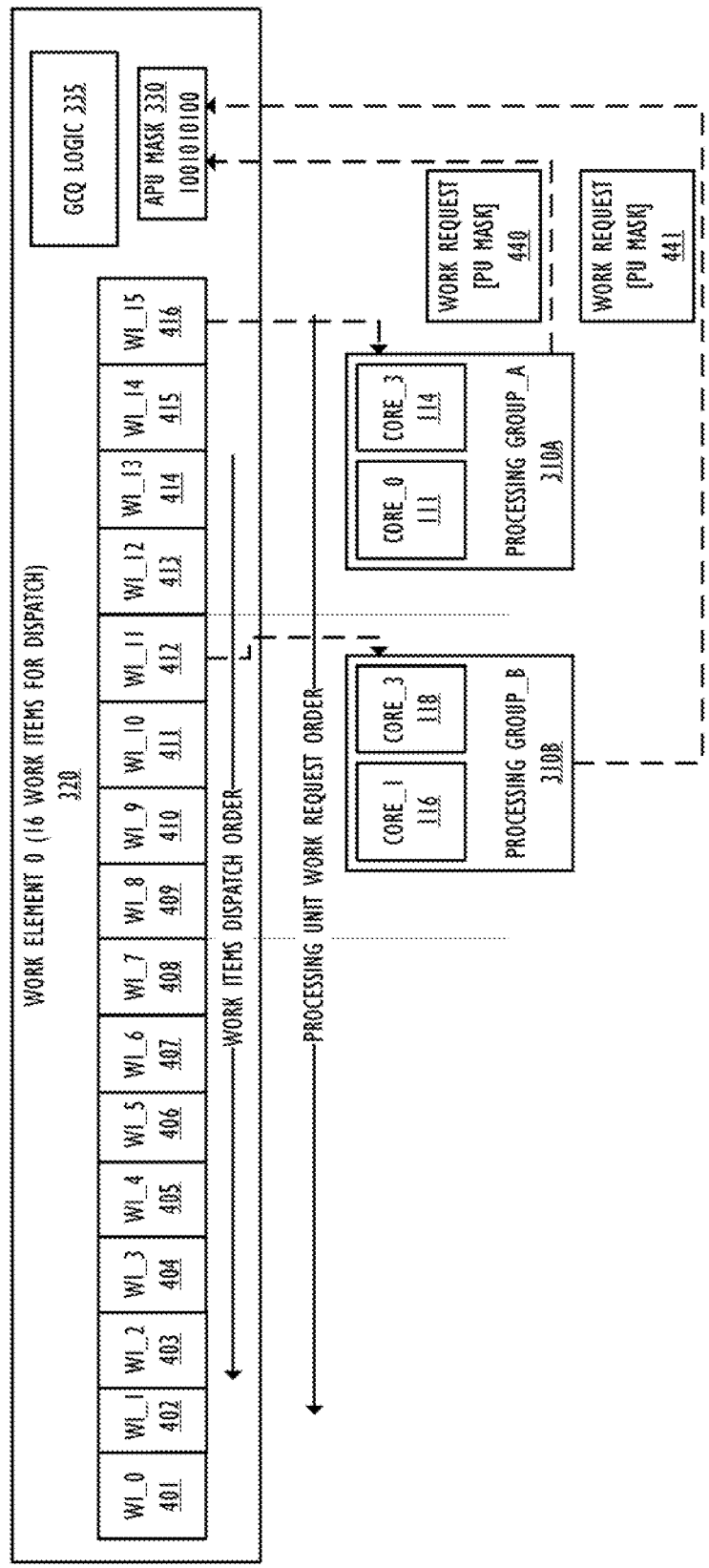
FIG. 4 illustrates a logical comparison of a PU mask of a processor core to an APU mask of a work element within the GCQ to determine which processor cores are allowed to retrieve work items from the work element, according to one embodiment.
Figure 5A:
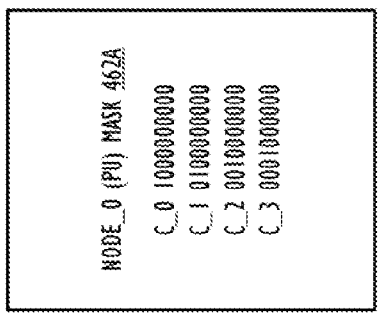
FIG. 5 illustrates a work request operation with subsequent retrieval of work items from a work element by processor cores whose PU mask matched the APU mask of the work element, according to one embodiment.
Figure 5A:
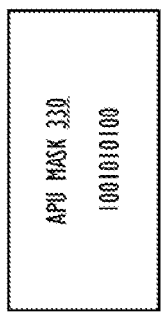
Figure 5A:
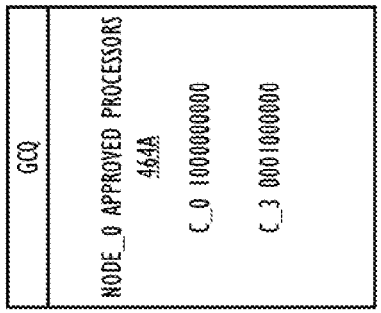
Figure 5B:
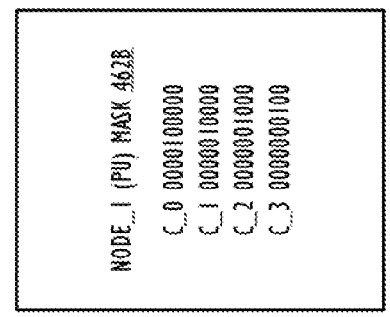
Figure 5B:
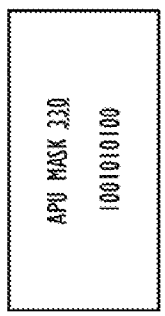
Figure 5B:
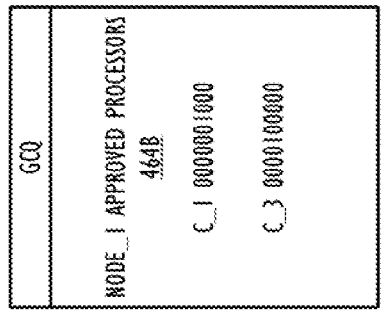

Referring now to FIG. 4, there is illustrated an expanded view of the work items within WE_0 an the associated APU mask 330 which provides access to the work items by select ones of the processor cores within example system architecture 300. As shown, WE_0 comprises 16 individual work items, from work item zero (WI_0) 401 through WI_15 416. The work items are dispatched to requesting processor cores in a particular dispatch order, which for purposes of illustration, is assumed to be in descending order (WI_15 416, WI_14 415, and so on) until the last work item WI_0 is assigned to a processor core. Associated with WE_0 is APU mask 320, which has a mask value of 10010101. The present example assumes that only processing node A 310A (FIG. 3) and processing node B 310B (FIG. 3) are represented within APU mask, such that a maximum of eight (8) processor cores from these two processing nodes may be assigned to process WE_0. Processing node C 310C does not include any approved processors (and the corresponding mask bits are 00 at the end of APU mask).

As shown by the example bit mask in FIG. 4, with a three node implementation, each of nodes A and B having four processing units/cores and node C having two processing units/cores, APU mask 330 includes 10 bits, one for each of the processing cores, such that if the work element within GCQ is intended to be processed by node A (having cores 0 through 3), then one of the first four bits in APU mask 330 will be set to 1. Conversely, if the work element is not intended to be processed by any processor cores in node C (having cores 8 and 9), then all of the last two bits in APU mask 330 will be zero (i.e., the bits are not set to 1).

In the example of FIG. 4, APU mask 330 provides that four processor cores out of a total of ten (10) possible cores within the system are selected and/or assigned to process work for WE_0. With APU mask 330, each bit corresponding to each selected processor core is set to one (1), while the bits corresponding to the other processor cores remain zero (0). Thus, with ten processor cores in the overall system, for example, an APU mask value of 1001010100 indicates that processor core 0, 3, 5, and 7 have been selected to process the WE_0. With processing nodes A, B and C of processing system 300 (FIG. 3), these mask bits correspond to core0 111 and core3 114 of processing nodeA 310A and core1 116 and core3 118 of processing nodeB 310B. For illustrative purposes, these processor cores are also shown as belonging to processing groups, which in one alternate embodiment enables work to be dispatched/grabbed at a processing group level (or node level) rather than the independent grabbing of work by each processor core. It should be noted, that in an alternate embodiment, a node-level allocation of work items can be implemented by which all processor cores in a particular node share the same node mask and the APU mask only tracks selected processor nodes. With the above example, of the three available nodes within the overall system, node A and node B are the selected processor nodes, and the value of the APU mask would be 110, with each bit representing a separate node. The efficiencies of performing the comparisons of the APU mask against the node masks are clear from the significant reduction in the number of bits that have to be tracked by GCQ logic 335.

FIG. 4 also illustrates part of the process by which the various processor cores attempt to "grab" work from GCQ 320, and specifically WE_0. When a processor core needs work, the core issues a work request, such as work request 440/441 to GCQ 320. The work request (440/441) is received and processed by GCQ logic 335 (FIG. 3). The work requests 440/441 comprise PU mask of the requesting processor core, as well as a chunk size parameter, indicating the amount of work (e.g., number of work items) the processor core would like to grab with the request. GCQ logic 335 and/or work request logic of the requesting processor core compares the PU mask of the processor core with the APU mask to determine whether the processor core may grab work items from WE_0. FIG. 5 provides an illustration of one method of completing this comparison. As provided by FIG. 5, each processor core has an associated PU mask. When the processor core issues a request to the GCQ for work, the GCQ logic 335 performs a logical AND of the PU mask of the processor core with the APU mask 330 to generate a result (i.e., a 1 or 0), where the result (if a 1) indicates that the processor core is approved to grab work from the corresponding work element. According to the example of FIGS. 4 and 5, the AND operation with first operand of APU mask 330 (with value of 10010101) with second operands of different PU masks (311-318) of the eight processor cores from the example system yields a "1" output/result for core0 111 and core3 114 of processing nodeA 310A and core1 116 and core3 118 of processing nodeB 310B.

Thus, as provided by FIG. 4, these approved/assigned processor cores are then able to grab work items in the work item dispatch order for execution by the respective processor core. For illustrative purposes, one or more processor core(s) of processing nodeA 310A grab a first set of work items, while one or ore processor core(s) of processing nodeB 310B grabs the next sequential set of work items. However, the order in which processing cores grab work items is not dispositive, as long as the work items are grabbed in a known sequence, which is maintained by the scheduler and/or compiler, to enable re-creation of the output.

In the above described work scheduling and dispatch method and system and according to the described embodiments, execution units process the commands from a single GCQ comprising multiple queue entries. Within the GCQ, each entry holds a work element (or work group) comprising multiple work items that are dispatched for execution by specific processing units identified by the APU mask 330 assigned/linked to the work element. As provided by the described embodiments, the execution/processing units are processing cores, which may be located across a distributed network. However, while processor cores are employed throughout the described and illustrative embodiments as examples of execution units, in other embodiments, the execution units may be any device that executed a command, including, but not limited to, processing codes, CPUs, threads, and even complete computing systems. Once a command is available on GCQ 335, each processor core allowed to participate in the execution of the command (as identified by the APU mask) atomically decrements the command's work items remaining (WIR) counter by a work reservation size (or chunk size) associated with the processor core. The processor core reserves a corresponding number of work items within a work group range for processing. Once the processor core has executed the requested work items, the processor core attempts to reserve more work items. This reservation and dispatch of work items in a given reservation size by multiple processor cores continues until the total number of work items within one entry of the command queue(s) have been processed.

Figure 7:
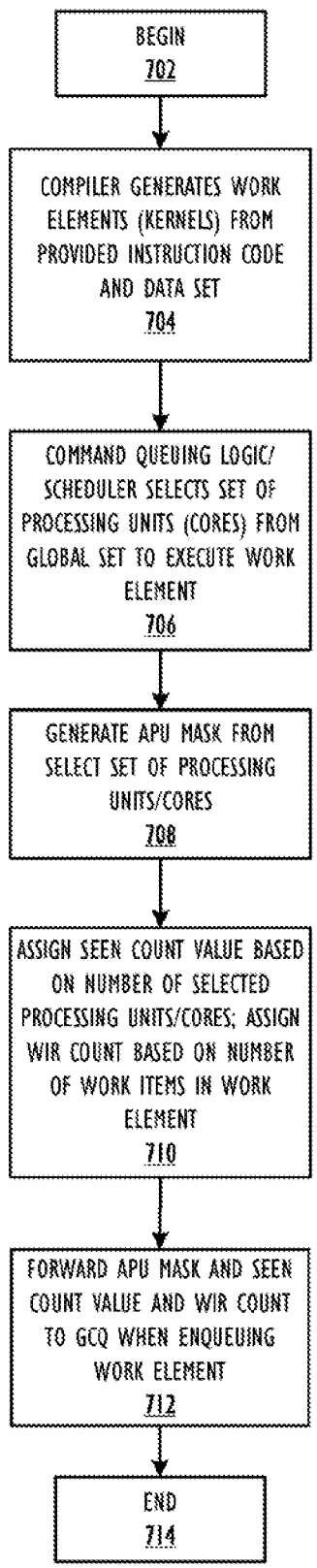
FIG. 7 is a flow chart of the method by which select processor cores are allocated for dispatching a work element and a corresponding APU mask and count variables are generated and assigned to the work element within the GCQ, in accordance with one embodiment of the invention.
Figure 8:
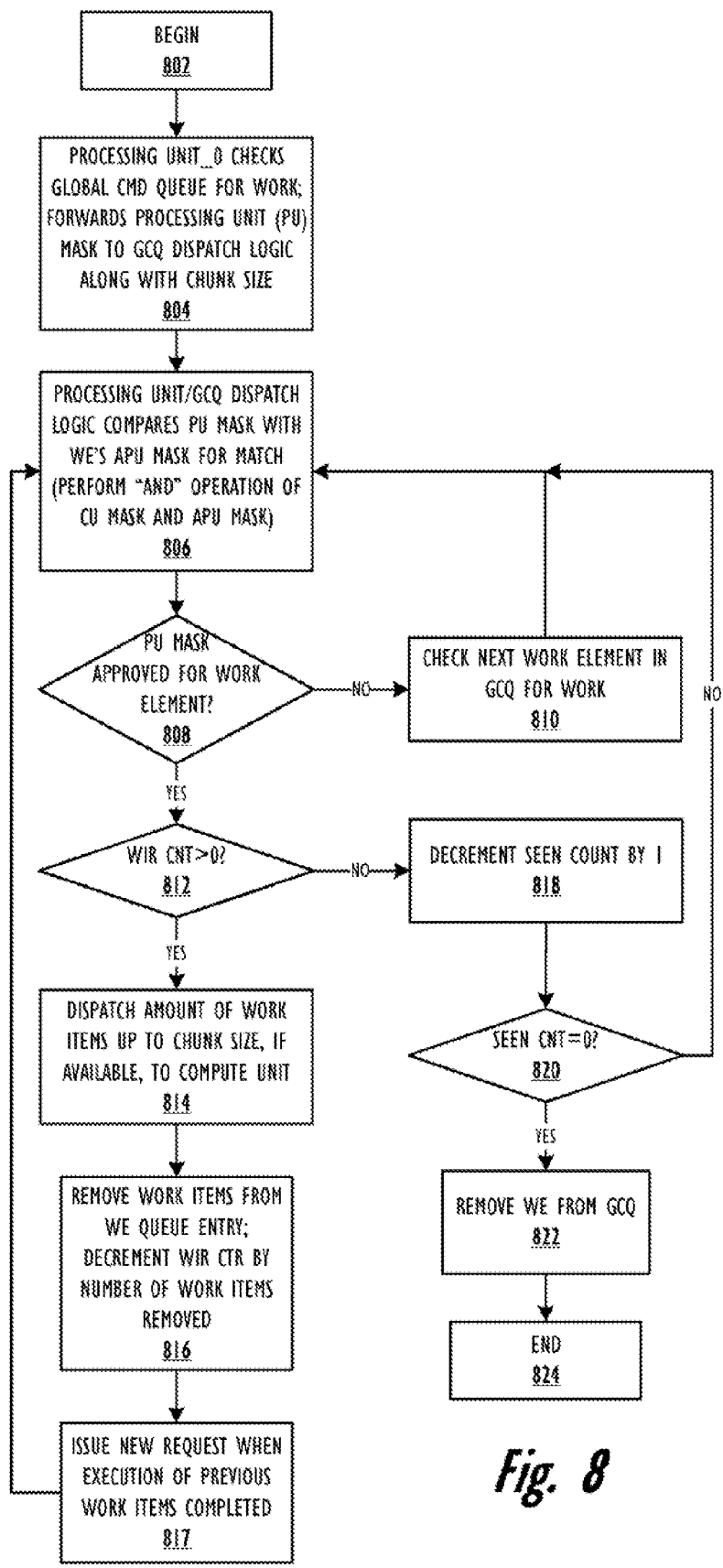
FIG. 8. is a flow chart of the method by which processor cores are verified for allocation of work items from the work element in the GCQ utilizing the APU mask and count variables to track completion of execution of the work items and the work element, according to one embodiment.

With the above functionality of assigning work to processing cores utilizing a GCQ, APU masks and PU masks, the process for scheduling and completing all work involves one or more methods that involve generation and tracking of various parameters to enable efficient work scheduling, dispatch and execution. FIGS. 7 and 8 provide flow charts of example methods for completing the above processes. The methods of FIGS. 7 and 8 are best understood when read in the context of the illustrations of FIGS. 3-5 described above, as well as with reference to FIGS. 6A-6D, which are concurrently described. It is appreciated that the methods may be recursive in nature; However, to simplify the descriptions, only a single iteration of each method is illustrated and described. Various portions of the method(s) are performed by processing unit executing instruction code of the executing task/thread, while other portions may be performed by firmware/logic associated with or executing on the processor. The method(s) is/are generally described from the perspective of processor operations, although it is understood that alternate embodiments of the method may be performed by GCQ logic 335 and GCQ scheduler (logic) 315, for example.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method of FIG. 7 begins at block 702 and proceeds to block 704 at which the compiler generates work elements (kernels or commands) from instruction code provided by a source program. The compiler 305 forwards the commands/kernels 310 to the GCQ scheduler 315. During runtime, the scheduler (logic) 315 selects a set of one or more of the available processing units (processor cores) from a global set of available processing units to execute the command/kernel 310, as shown at block 706. GCQ scheduler 315 also generates the APU mask corresponding to the selected set of available processing units, at block 708. As shown at block 710, GCQ scheduler 315 also assigns (a) a seen count value based on the number of selected processing units and (b) a work item remaining value based on the number of work items associated with the work element. In an alternate embodiment, the WIR count may be generated and updated by GCQ logic 335, perhaps based on a detection of the actual work items scheduled within work element. Finally, as proved at block 712, GCQ scheduler 315 forwards the APU mask 330, seen count, and WIR value to GCQ 320 when an entry becomes available in GCQ 320. The process then ends at block 714.

At the termination of the above processes, GCQ 320 comprises an entry populated by the work element and associated properties, parameters and attributes. Referring again to FIG. 6A, WE_0 is populated in the first entry of GCQ 320 and is ready for dispatch of its 16 work items by the four approved processing units identified by the APU mask.

Turning now to FIG. 8, which depicts the method by which the work items of WE_0 are dispatched by the processor cores of the system. The method begins at initiation block 802. At block 804, first processing unit (e.g., processor core_0 311) issues a request to the GCQ to check the availability of work. The request provided by first compute unit comprises its PU mask and the chunk size, which are forwarded to GCQ logic 335. At block 806, the processing unit (or the GCQ logic) compares the PU mask with the APU mask of the first work element (and subsequent work elements, if unsuccessful in scheduling work), and determines at decision block 808 whether the comparison of the PU mask with the APU mask indicates that the PU is approved/authorized/pre-selected to grab work items from that work element. According to one embodiment, and as illustrated by FIG. 5, the process by which a processing unit confirms that it is one of the selected processing units to execute a particular work element involves performing a logical AND of the APU mask of the work element and the PU mask of the processor core. If the processing unit is not approved/authorized/pre-selected to execute work items of the work element, GCQ logic 335 forwards the request to a next work element in the GCQ, as shown at block 710. Thus, the request from the processor core moves on up the GCQ to the next entry, and the same check is performed against the APU mask of the next work element with the PU mask in the request. In this manner, a processor core only removes work from a work element when that processor core has been pre-selected by the scheduler to execute work of that work element.

As further illustrated by FIG. 6D, the processing units that are not approved for processing WE_0 may also concurrently schedule work from a different work element at which the processing unit is approved. For example, processing unit 2 of processing node A 310A may schedule work from WE_1 within GCQ 320, after first being rejected at WE_0. When work items are scheduled on processor core 1, the WIR counter and the seen counter of WE_1 are decremented. As shown, WIR counter of WE_1 is decremented by 10 as ten work items are scheduled on processing unit 2, and the seen count of WE_1 is also decremented by one (1).

When the processor core has been confirmed as an approved/authorized/selected processing unit, GCQ logic 335 then checks the value of the WIR counter, and determines at block 812, whether the WIR count is greater than zero (0). When the WIR count is not greater than zero, GCQ logic 335 decrements the seen count value by one (1), as provided at block 718. When the WIR count is greater than zero (0), GCQ logic 335 allows the processor core request to pull/grab an amount of work items form the work element up to the chunk size identified in the request, as indicated at block 814. GCQ logic 335 monitors the removal/dispatch of the work items from the queue entry and decrements the WIR counter by the number of work items removed, as shown at block 816. The process then proceeds to block 817, which issues a new request when execution of the command on the previously retrieved work items have completed. The same processor core may thus continually issue requests to the GCQ and retrieve work from the same work element until all work of that work element has been assigned.

It is important to note that the number of work items remaining to be dispatched for execution may be less than the chunk size requested by the processor core. In this scenario, all of the remaining work items are provided to the requesting processor core, and the WIR counter is reduced to zero (0). Also, in an alternate embodiment, the chunk size is pre-set within the GCQ, such that either (a) all processor cores are allowed to take the same chunk size of work or (b) larger chunk sizes can be requested but are scaled as whole number multiples of the pre-set chunk size. In the presently described embodiment, the chunk size is parameter set by the processor core (or processing node) and encoded within the request.

The value of the WIR counter is utilized to determine when more work items are available for grabbing, and is decremented each time work items are allocated to a requesting, approved processor. As indicated by the sequence of FIGS. 6A-6D, as each approved processor removes its chunk size of work from the work element, the GCQ logic decrements the WIR counter by the number of individual work items removed (e.g., the chunk size). For illustrative purposed, a single chunk size is assumed of four (4) work items. Thus (referencing WE_0 of FIG. 4), a request issued by a first processor unit (e.g., request 440 from processor core0 311) removes work items 15 through 12 from WE_0. GCQ logic 335 decrements WIR counter from 16 to 12 (FIG. 6B). Similarly, when second processor unit request 442 from processor core 1 316 removes work items 11 through 8 from WE_0, GCQ logic 335 decrements WIR counter to 8, and so one, until WIR counter equals or goes below zero (0) (FIG. 6C).

The above method processes describe the GCQ scheduler and/or GCQ logic queuing a work element within the GCQ and the processing elements subsequently removing work from the work element for execution. These processes include/involve GCQ logic 335 (or other logic) updating/modifying certain parameters/attributes of/associated with the work element to enable sequenced retrieval of different work items by each approved processing unit that submits a request for work. An additional mechanism is provided to also track when dispatching of all work from the work element has completed, in order to allow the work element to be removed/discarded from the GCQ.

Work elements are released from the command queue when all the cores within the overall system or all the cores selected to dispatch the work element (depending on implementation) have seen the work element and do not need to process the work element further. Tracking of the number of processing units that have seen the work element is provided by an atomic decrement of a seen counter that begins with the total number of processor cores, and is decremented each time a different one of the processing units "looks at" (i.e., attempts to schedule work from) the work element. When the last processor core has seen the work element, the seen counter is decremented to zero and the last processor core then notifies GCQ scheduler 315 or GCQ logic 335 that execution of the work element has completed.

Returning now to block 812 of FIG. 8, when the WIR counter value of a work element is zero (or less than zero), indicating that no more work items remain to be dispatched, and a request from an approved processing unit is received, GCQ logic 335 decrements the seen counter by one (1), as provided at block 818. At block 820 of the flow chart, a decision is made whether the seen count equals zero (0). If not, GCQ logic 335 monitors for receipt of subsequent requests from each other approved processing unit, and decrements seen count for each request received from a different, approved processing unit. Once all the approved processing units have submitted requests that are rejected because there is no more work to dispatch, the seen count is finally decremented to zero. The decrementing of seen count for WE_0 is illustrated by FIGS. 6C-6D. Once seen count becomes zero, the work element is removed from or overwritten in the GCQ 320, as shown at block 822. The process then ends at block 824.

Features of the provided embodiments can advantageously be implemented in multi-node processing systems which exhibit low data transfer latencies and low cross communication latencies between the processor cores and a memory location of the local node. Given that the processing nodes are retrieving work from the central/common GCQ, the latency to the GCQ for the different nodes is relative short, such that the overall work retrieval process incurs an acceptable latency penalty in overall processing time for the processing cores that are grabbing work from the GCQ 320.

With the implementation of the single command queue, the need to synchronize across multiple command queues of multiple nodes is substantially eliminated. The described embodiments are adapted for implementation on multi-processor compute systems (or system architecture) that exhibit small penalty (latency) when synchronizing across compute nodes. For example, with NUMA nodes that are connected via a "local" fabric, such as within a single physical device (e.g., local processing system 301), there is a relatively small latency penalty when synchronizing distributed work of a single kernel (work element) across the multiple nodes. This further enables the completion of N Dimensional work and data intensive operations to/on NUMA systems with low cross node latency.

Also, with the described embodiments, there is no longer a requirement for multiple individual command queues that are each tied to a separate node in order to support NUMA affinity. With the single GCQ implementation, each work element within the single GCQ includes a mask field comprising N bits, with specific bits set to identify which execution nodes and/or which processing unit(s) (or processor cores) are linked to the work element for completion thereof. The N bit mask provides a unique identification of each separate node and/or processor core so that the same single command queue can be utilized across multiple nodes, while allowing the nodes/cores to correctly grab work assigned to the particular node/core from the GCQ. Because the present description of one embodiment includes specific reference to a NUMA system architecture, the N bit mask may also be referred to within this embodiment as a NUMA mask, and each executable element (e.g., core_0 311) is assigned a NUMA mask that is unique for the particular node or the particular processing unit (depending on the level of granularity desired). When a new command is placed in an entry of the single GCQ, the new command (work element) is marked/tagged/assigned/affiliated or otherwise associated with a specific NUMA affinity via the NUMA mask.

The above embodiments are applicable to systems that have NUMA regions close enough so they can share the GCQ efficiently. This is especially true for workloads where a common function is being executed multiple, independent times. Each work element in the GCQ contains an APU mask, work remaining count (in the case of multiple iterations of a process), and a seen count. With these functional variables and system configuration, a work element within the GCQ is scheduled as follows: (a) the processing unit checks if the processing unit's NUMA bit is set in the next work element's APU mask; (b) if the processing unit's NUMA bit is not set in the APU mask, the processing unit decrements the seen count, indicating that the unit has finished with the work element, and the processing unit advances to the next element; (c) If the processing unit's NUMA bit is set, the processing unit decrements the work item remaining (WIR) count by a tunable "chunk size", based on the actual amount of work retrieved from the work element by the processing unit; (d) If the result of the decrement is a value indicating that there is no more work (e.g., 0 remaining work items), the processing unit decrements the seen count, which indicates that the processing unit has finished with the element. The processing unit then advances to the next work element; (e) if the processing unit is the last processor core to see the element (i.e., seen count is equal to zero), indicating all the processor cores have seen the work item at least one, the processing unit marks the location in the global queue as "free."

At the processing unit (processor core), the processing unit executes each work item in that retrieved chunk until the execution of the chunk of work is completed. The processing unit then issues a next request to the queue to get more work.

Certain of the features of the described embodiments may lend themselves to N Dimensional (ND) Range processing/execution paradigms, such as provided by OpenCL™ and similarly structured applications executed on multi-core data processing systems in which an execution command contains the information necessary to efficiently execute and balance work load of the command, which may include data or task parallel processing requirements. Each command includes information corresponding to the total number of work groups within the command to be executed, the number of work groups remaining to be computed, the number of work groups already processed, the number of work groups to process at a time (reservation size). Other information provided by the commands may include the number of execution threads to process in the command and the number of execution threads that have seen the command.

Within this ND Range execution paradigm, and according to the presently described embodiments, execution units process the commands from a single global command queue comprising multiple queue entries. Within the GCQ, each entry holds a work element comprising the command and multiple work items that are dispatched for execution by specific processing units identified by an APU mask assigned/linked to the work element. As provided by the described embodiments, the execution units are processing cores, which may be located across a distributed network. However, while processor cores are employed throughout the described and illustrative embodiments as examples of execution units, in other embodiments, the execution units may be any device that executed a command, including, but not limited to, processing codes, CPUs, threads, and even complete computing systems. Once a command is available on the global command queue, each processor core participating in the execution of the command (as identified by the APU mask) atomically decrements the command's work items remaining (WIR) counter by a work group reservation size (or chunk size) associated with the processor core. The processor core reserves a corresponding number of work items within a work group range for processing. Once the processor core has executed the requested work items, the processor core attempts to reserve more work items. This reservation and dispatch of work items in a given reservation size by multiple processor cores continues until the total number of work items within one entry of the command queue(s) have been processed.

C. Architecture for High Latency Processing Nodes

The above described embodiments operate well for low latency processing nodes, by which all work items are processed on the same node of local node group exhibiting low latency between processor nodes and the GCQ. Thus, with these embodiments, there is a need for a approved processing node bit mask (e.g., eight bits of is and zeros representing which node has been assigned processing permission for the particular work element). With low latency operation, the nodes each process in chunks (or groups of 4 work elements) until the total number of sub-elements (e.g., 16) have been processed, and all nodes (8) have seen the work element. With the seen counter for the nodes, if there is no work left to do at the work element, then the logic decrements the seen count from 8 to 7, then 6, and so on, until the seen count=0. If there is work to assign, then GCQ logic assigns with chunks of 4 and the unassigned attribute/counter has been change from 16 to 12 then to 8 then to 4, then zero. Once the number of un-processed element count reaches zero, there is no more work associated with that work element. The processing nodes then come in and check the command queue and each one decrements the compute unit counter from 8 to 7, and all the way to zero. Once the seen counter reaches zero, the entry of the command queue hosting the work element is freed up for assignment of a new work element.

For systems in which at least one processing node exhibits a larger latency penalty when communicating with other processing nodes and to a general system memory construct, such as the GCQ, an additional mechanism is provided by which the high latency processor cores are able to efficiently retrieve and dispatch work from the GCQ without providing a large number of requests on system fabric. Work contention for such high latency processing nodes with the low latency nodes within the system, if any, or other high latency nodes is substantially reduced.

In prior art systems of GPU, the entire work completion waits for the slowest GPU to complete processing. With systems employing both PPUs and SPU, the PPUs are generally much slower leading to a stealing of work by the SPUs as the longer latency PPUs get starved out of processing a lot of work Within the illustrative embodiments, described below, each processing node shares a single global command queue, and each processing node also maintains a "staging queue". The size of the staging queue is equal to that of the global queue. Work is pulled, piece-wise, into the staging queue where the locally staged work is shared by all processor cores in the single processing node. With one embodiment, the system infrastructure provides for a single GCQ and multiple (up to Y) LCQs, where Y represents the total number of processing nodes. Each node may be a NUMA node, but the invention is of course applicable to other types of multi-node, distributed processing systems. All queues have the same number of work elements and work element X in the global queue corresponds to work element X in the NUMA queue. The scheduler places work to be done in the global queue. During local execution, all work is fetched by the processor cores first from the staging queue (LCQ), and work is only fetched from the GCQ when there is no work within the LCQ.

Figure 9:
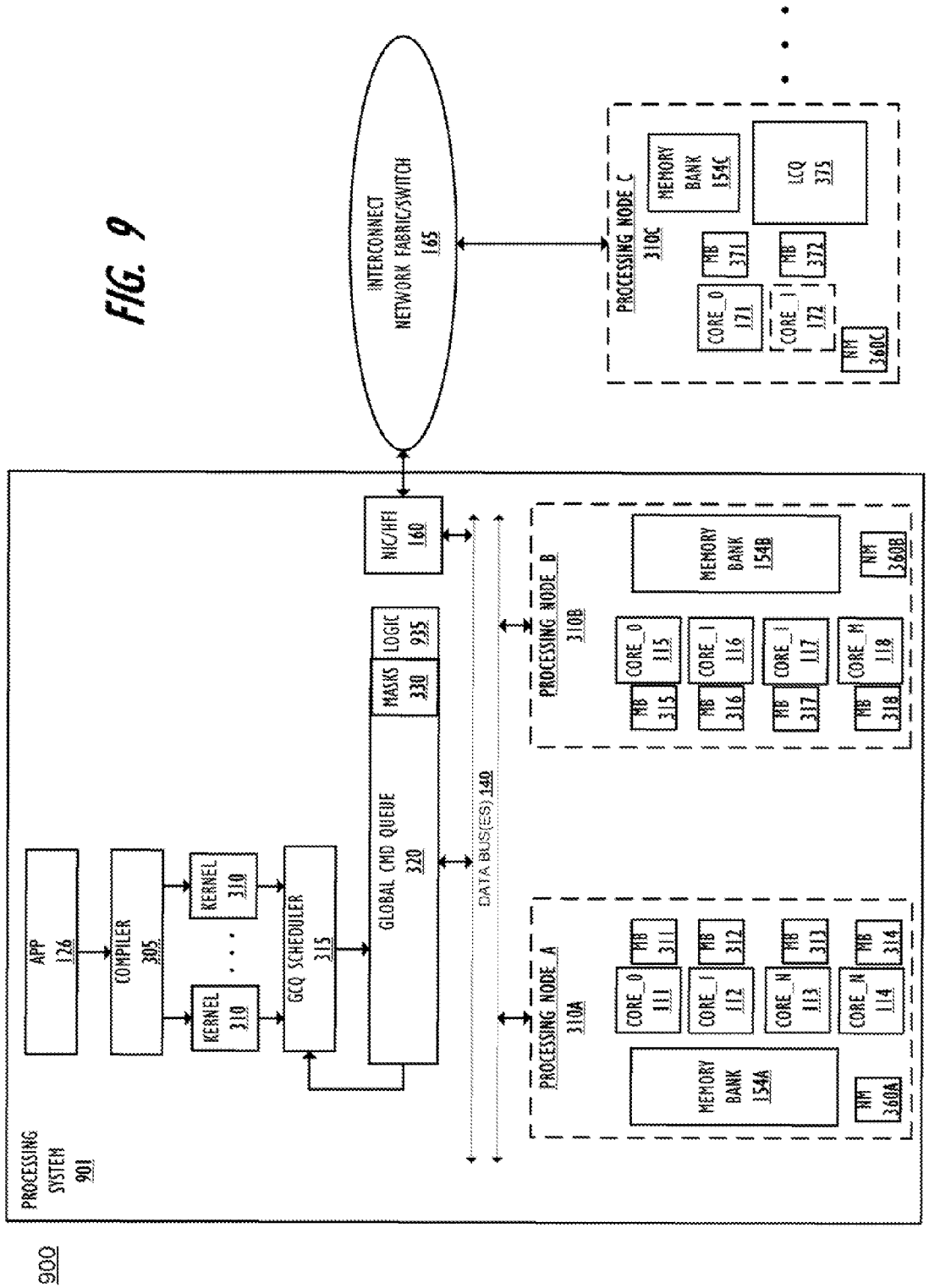
FIG. 9 is a multi-node processing system architecture with high latency between one or more processing nodes and the GCQ, where efficient processing of a work element is supported by local work queues provided at each processing node, in accordance with one embodiment of the invention.

Referring now to FIG. 9, there is illustrated an example distributed processing system architecture 900 with a somewhat similar configuration as that of FIG. 3, which has been previously described. Because of the overlap in the two figures, the common components in FIG. 3 are not described in detail for FIG. 9. However, FIG. 9 provides certain structural and functional differences, which will now be described.

In addition to the implementation within multi-node processing system architecture 900 of GCQ 320, as well as unique node mask bits per node and/or unique execution unit mask bits per execution unit (depending on granularity implemented), multi-node processing system architecture 900 further includes local command queue (LCQ) 375 within processing node C 910. With this configuration, processing node C 900 is assumed to exhibit high access latency to the GCQ 320 relative to a pre-determined threshold latency value below which value access by a processing unit to the GCQ is identified as a low latency operation. LCQ 375 enables the high latency processing node to stage a larger chunk of work items retrieved from GCQ 315 in a local storage area, LCQ 375. With the larger chunk of work items locally staged, the high latency processing node spends significantly less time contending on the global interconnect with other nodes and/or at the GCQ for work, and the high latency processing node is able to spend more time doing useful work on the retrieved work items. With this illustrative embodiment, the other processing nodes are assumed to be low latency nodes and do not require a LCQ for processing work items retrieved from GCQ 315.

Supporting the retrieval of a larger chunk of work items from GCQ 320 is GCQ logic 935, which for purposes of the present disclosure is assumed to provide additional logic to support work allocation of variable chunk sizes. According to one embodiment, GCQ logic 935 also provides dynamic modification of chunk sizes allocated to high latency processor nodes based on an analysis of historical latency data, prior work allocation data, current chunk size requested, amount of remaining work for the work element, and efficiencies of allocating larger chunk sizes to the high latency nodes (910).

Figure 10:
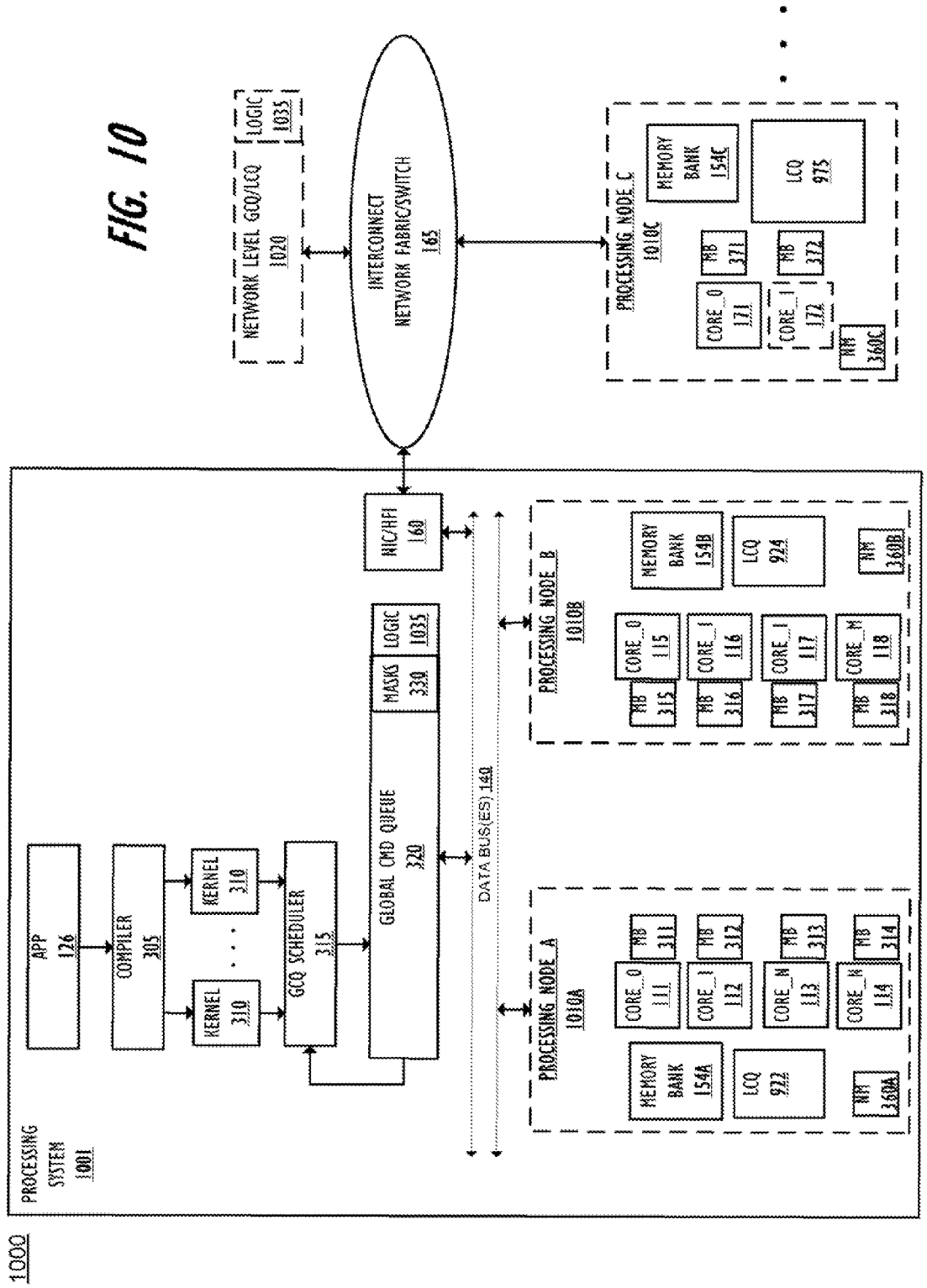
FIG. 10 illustrates a hybrid multi-core data processing system architecture with local work queue provided only for those processing nodes that have a high access latency to the GCQ, according to one embodiment.

FIG. 10 provides a second representative illustration of a multi-node processing system 1000 in which each processing node is provided an LCQ. Thus processing node A 1010A has LCQ 1022, while processing node B 1010B has LCQ 1024, and processing node C 1010C has LCQ 975. With this configuration, it is assumes that all processing nodes within the overall multi-node processing system 1000 are high latency nodes and thus each node includes an LCQ for staging work items retrieved from GCQ 320. The LCQ logic thus operates as work scheduling logic within the respective processor nodes. It is important that while illustrated as a separate component within the respective processing node, each LCQ may be a specific range of address space within the local memory bank (154A-154C) of the respective processing node (1010A-1010C). Regardless of where located, the location of the LCQ is considered "local" to the particular processing node in that the processing units within the processing node are able to access the LCQ with relatively low latency. In the illustrative and described embodiments, the latency of operations between the local processing units and the LCQ is a substantial factor smaller than the latency of similar operations with the GCQ 320. Also, as will become clearer below, in one embodiment, there is no contention for access to the work items staged within the LCQ with processing units of other nodes.

In an alternative embodiment, however, a cluster of nodes that form a local processing group may exhibit low access latency (below a second threshold latency value) to an LCQ that is not necessarily located on the same processing node as each execution unit. With this alternate embodiment, each such local processing group is assigned an LCQ, such that the LCQ is assigned across multiple nodes but provides low access latency to all execution units within those nodes. Because access to the GCQ 320 from these execution units within the processing group exhibit high access latency, larger chunks of work items are staged at this cross-node, shared LCQ for access and dispatch by the different execution units within the local processing group.

In a general sense, LCQ 375 is provided to reduce the number of times processes across high latency nodes hit a single memory location (e.g., GCQ), irrespective of the presence of low latency nodes within the system, which may or may not access a same LCQ. In one implementation, and as illustrated further by FIG. 10, system architecture 1000 may provide a network level GCQ 1020 and associated logic 1035. With this configuration, the actual location of GCQ relative to the processing nodes, including the node at which the work is generated, is inconsequential, as the GCQ 1020 then provides a network staging area for placement of work items that are dispatched across the network interconnect/fabric. Similarly, as well, GCQ 1020 may just as easily be an LCQ that is network accessible rather than being physically situated on the processor nodes of the processing units which access the LCQ.

According to one embodiment, a local copy of work item remaining (LWIR) count is maintained in the processor node to track the work items within the LCQ that remains to be dispatched to one of the local execution units. Thus during operations at the processor node, which operations involve work being retrieved from the LCQ, the LWIR is updated (decremented) until the LWIR count reaches zero (0). During this period, no update of the global count is required or performed. However, once the last execution unit performs an update of the LWIR count value and subsequently reduces the LWIR count within the LCQ to zero (0), that last execution unit forwards an update to the GCQ. Thus the updates to the head queue only occur once all work has completed at the local node. Also, since only the last execution unit performs an update of the GCQ WIR count value, only one node update to the LWIR count is required, and the GCQ update is performed only after all local updates of the LWIR count are performed. The embodiments thus enable an atomic decrement of the local count, and the last compute unit that decrements the count to zero then knows that it is responsible for providing the atomic update to the global count.

By requiring only the last execution unit to decrement the count value to communicate with the GCQ, the node logic reduces cross chatter on the interconnect fabric because the GCQ only has to be updated once per region instead of once per workgroup. The described embodiments works very effectively with example systems with a high penalty for going across processor nodes.

As with the operations within GCQ 320 described above with reference to FIG. 6A-6D, each work element in the LCQ tracks the number of computer units (e.g., 4 in the illustrative embodiment), and the work elements may include multiple executable processes/tasks/elements for completion (e.g., a 4,4, dimension space with 16 elements in the illustrative embodiment). With this example system, and assuming high latency processor node 1010C, at least one of the execute units (e.g., processor core 171) is unable to reach the GCQ in time to grab work from the work element, WE_0, which is being scheduled to all three processor nodes, and processor core 171 and 173 effectively starves, leading to inefficiencies in overall processing. With the LCQ, however, the high latency processor nodes are able to grab more than a single chunk of work at a time from the GCQ. The first requesting processing unit of the high latency processor node issues a work request requesting a larger chunk of work. When the larger chunk is returned to the processing node, the work items are stored in the LCQ of the requesting processor (or LCQ associated with the requesting processing unit). Work items are then executed by the different pre-approved local processing units, which grab work from eh LCQ, until all the work is completed.

Concurrently, low latency processing nodes and/or processing units continue to grab a smaller chunk size of work from GCQ, but do so more frequently. Thus, the high latency processor nodes automatically reserve a larger chunk of work than the single work items (or standard chunks reserved by low latency nodes). With the above implementation, contention on a high latency path is substantially reduced, and the high latency nodes also receive enough work to keep processing while the local nodes continue to pound the LCQ at the lower latency and consume new work more quickly but at lower chunk sizes. The example provide by FIG. 10 assumes all processing nodes have significant enough latency of operations with the GCQ for the entire system architecture to be set up to grab multiple chunks of work at a time, and stage that work at LCQs, to reduce cross-node request contention for work items on the request bus.

Figure 11:
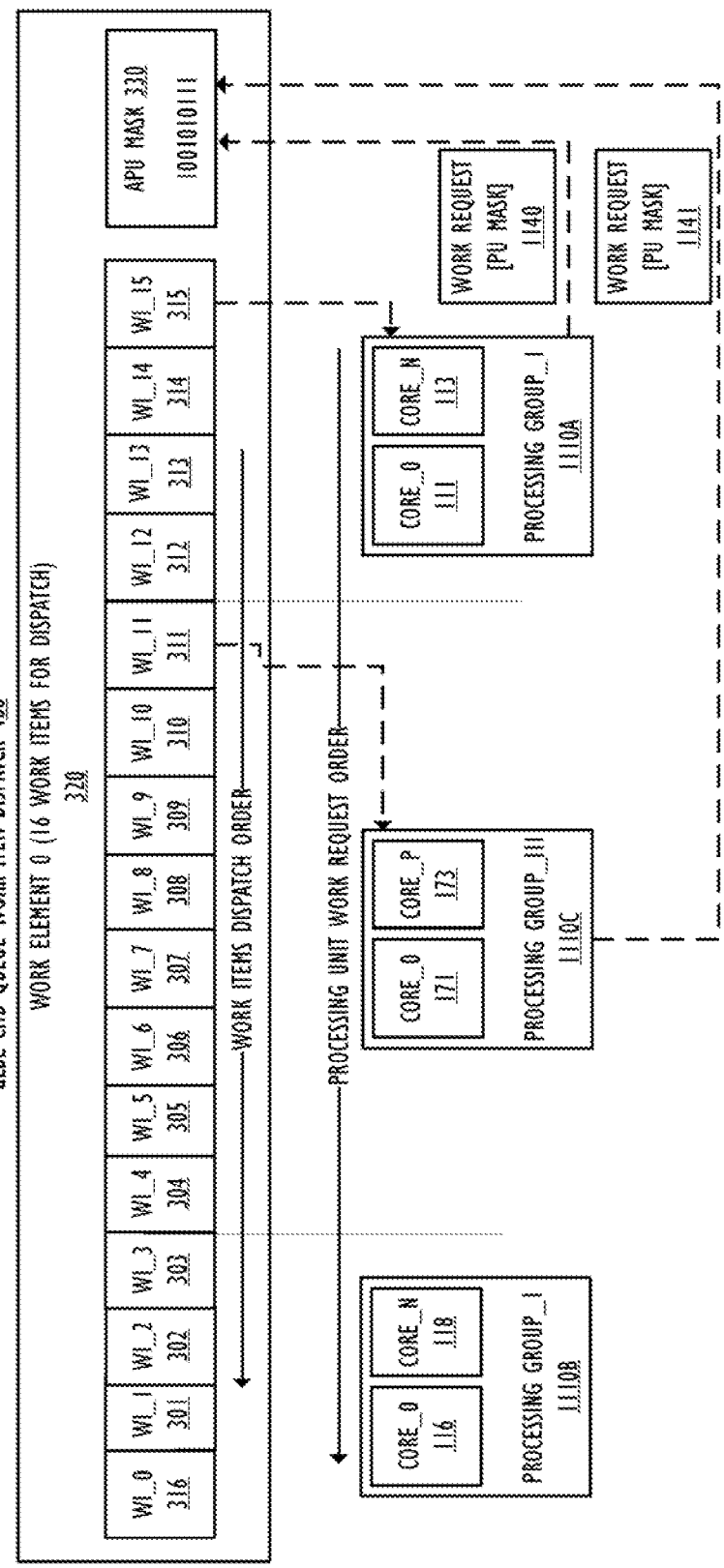
FIG. 11 illustrates work retrieval from a work element by first processor cores with low access latency to the GCQ and second processor cores with high access latency to the GCQ, according to one embodiment.
Figure 12:
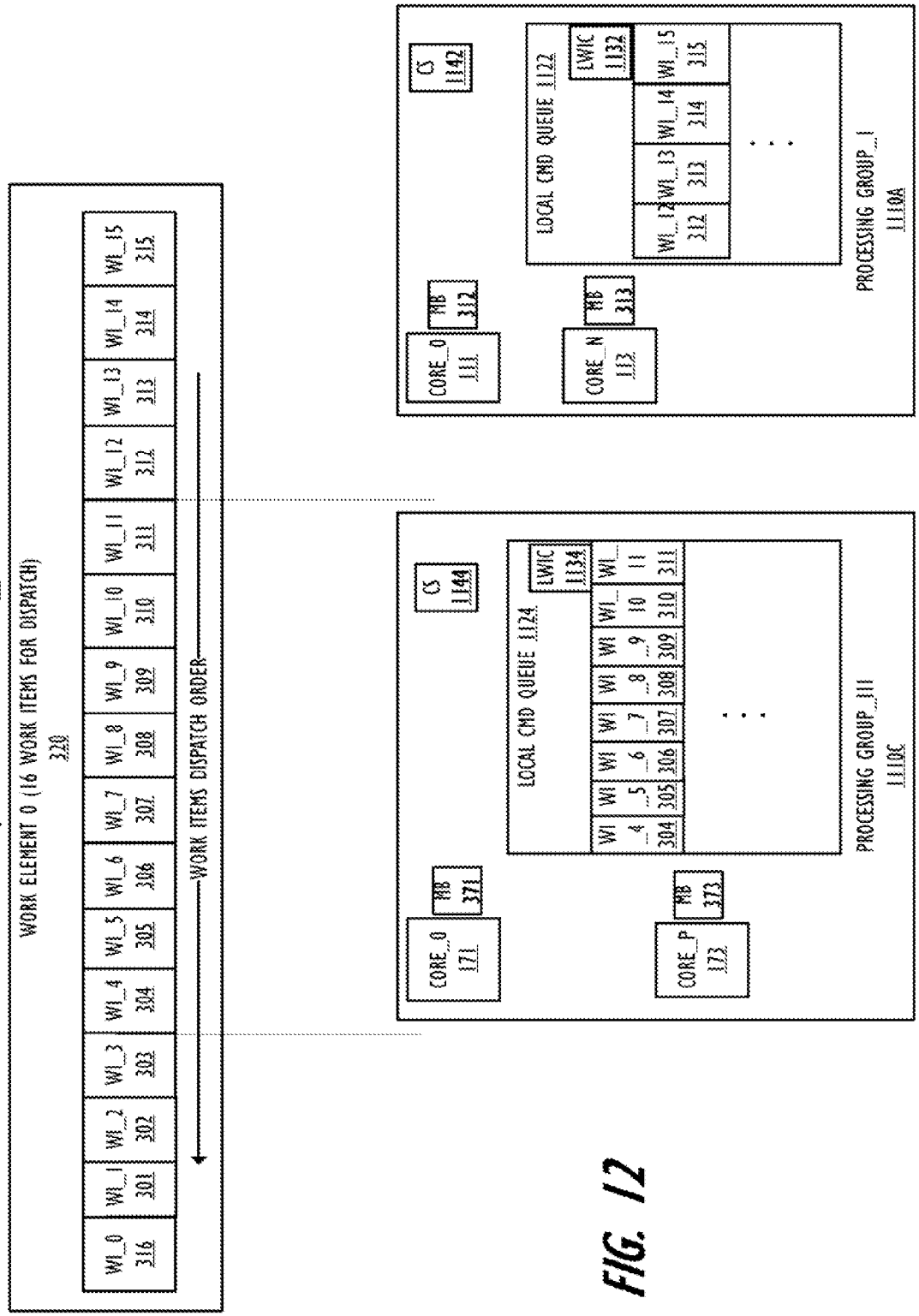
FIG. 12 illustrates work completion processes at a processing node with high access latency to the GCQ via a local work queue, according to one embodiment.

Referring now to FIGS. 11 and 12, there are illustrated sequence diagrams indicating the request and retrieval of multiple different chunk sizes of an example work element in a hybrid work assignment scheme which assigns variable chunk sizes to different processing nodes based on the node's access latency. During initial dispatch for work from the work element, both low latency processor cores 1110A, 1110B and high latency processor core 1110C issue work requests 1140, 1141, respectively. The work requests are received by GCQ logic 1030, which processes the requests for matching PU masks to the APU mask of the work element. As further shown by these figures, work is dispatched in descending order of work items as follows:

Processing group 11110A receives the first standard chunk of four (4) work items in response to the GCQ logic approving the processing node or requesting execution unit (utilizing the APU mask versus PU mask comparison) as an approved processing node for the work element, WE_0 1122. The allocation of the standard chunk size may be based on one or more of: (a) the actual chunk size encoded within the work request 1140; or (b) the pre-set chunk size encoded within the GCQ logic, which may be for the specific work element or generally for all work elements of the GCQ; or (c) a calculated chunk size based on one or more factors, which includes the latency to the requesting node, the speed of completion of a known chunk size, historical factors, pre-programmed chunk sizes for the particular processing nodes, the amount of work items remaining for dispatch, the number of processing units pre-approved and available to process WE_0 1122; or (d) a combination of the above list of factors (a-c). When GCQ logic processes work request 114 of high latency processing group, processing group III 1110C, and following the approval of the PU mask of the processing group compared against the APU mask 330 of WE_0 1122, GCQ logic allocates a larger chunk size to processing group III 1110C. In the illustrative embodiment, GCQ logic allocates a chunk size that is twice the size of the regular/standard chunk size, or eight (8) work items. GCQ logic performs the allocation based on one or more of the above factors. However, in one or more embodiments, the latency of operations originating from the high latency processing node coupled with the historical speed at which the processing node dispatches assigned work may be primary factors in one or both of: (a) the chunk size requested by the processing node III, which size is encoded within the work request 1141 and represents the chunk size returned by the GCQ logic when no additional calculation is performed at the GCS logic; or (b) the chink size calculated by the GCQ logic, when such calculations do occur. When calculations are performed by GCQ logic, the larger chunk sizes may be a pre-selected or dynamically selected multiplier, such as 2×, 3× . . . and so on, based on the actual latency and speed of work dispatch of the high latency processing node.

FIGS. 11 and 12 also shows the work request 1142 from processing group II 1110B, which receives standard chunk size of work items in response to the work request. The order of processing of work requests and/or order of dispatch of work items is not important in the above described sequence. Also, while the illustrative embodiment presents only 16 work items, the embodiments are contemplated as being performed with work elements having hundreds or thousands or more of work items, with chunk sizes ranging from one (1) to X, where X is some integer smaller than the total number of work items. In the extreme case where only one node is processing a particular work element, there is no contention for the work element and thus the chunk size may be arbitrary even for a high latency node. Also, assuming there are two nodes, both of which are high latency nodes, the work element may be placed within a copy of the GCQ or a GCQ located at a different accessible location within the distributed multi-node processing system architecture that reduces the overall latency for both processing nodes.

With specific reference to FIG. 12, the work items retrieved from GCQ are placed within LCQs of the requesting processing node. Each processing node/group 1110A/110C has a corresponding chunk size (e.g., CS 1142 and CS 1144), which may be different for each node and may be dynamically variable, particularly for high latency nodes. Thus, standard/first chunk size of work items, WE_15 through WE_12, are stored within LCQ 922 of processing node A 1010A, while larger/second chunk size of work items, WE_11 through WE_4, are stored within LCQ 924 of processing node C 1010C. In one embodiment, the process of retrieving work from the GCQ may be described from the perspective of logic executing on the processing node and controlling operations of the LCQ (i.e., LCQ logic). During a work request cycle, one execution unit (e.g., core0 171) of processing node C 1010C generates and issues to the system interconnect fabric a work request (1141), which includes the PU mask of the executing unit and/or the node (again depending on granularity of mask implementation). The specific work request 1141 grabs a larger chunk size (specifically two chunk sizes) of eight (8) work items and places the work items in the LCQ when the work items arrive at the processing node 1010C. According to one embodiment, the chunk size attribute may be stored as a pre-set or dynamically calculated parameter of the specific node, and each node may have a pre-set default chunk size and appropriately sized LCQ to hold that chunk size of work items. In another embodiment, the size of the LCQ is variable, as the LCQ is created and maintained within local node memory or within other low latency storage when the LCQ is required for staging work from a remote (high latency) GCQ. The variability of the size of the LCQ may then be tied to the dynamic nature of the chunk size calculation.

Returning to the illustrative embodiment, processing node C has higher (than a pre-set threshold) access latency to GCQ than processing node A 1010A and thus processing node C 1010C retrieves/grabs a much larger chunk size of work for storage in its LCQ 1124 than processing node A 1010A. During work request/dispatch cycles, processing node C 1010C or execution units of processing node 1010C grabs one chunk of four (4) work items containing work items 15 through 12, and stores these work items in Node A's LCQ 1122. Somewhat similarly, processing node C 1010C or execution units of processing node 1010C grabs two chunks of work items containing work elements eleven (11) through eight (8) and seven (7) through four (4) and stores these work elements in Node C's LCQ 1124. As shown in the illustration, the number of work items placed remaining within the LCQs of each processing node is tracked via local WIR (LWIR) counters. Thus, LCQ 1122 is assigned LWIR counter 1132, while LCQ 1124 is assigned LWIR counter 1134. At GCQ 1120, the requested chunk size for processing node C may be modified by a chunk size multiplier (of GCQ logic) or based on a pre-established high latency processor chunk size, which provides for retrieving eight (8) work items rather than a standard chunk size of four (4) work items. While chunk sizes are described herein as multiples of four (4) work items, that number is arbitrary and provided solely for illustration. Any number of work items may be provided within each chunk of work dispatched in response to each work request. Thus, for example, a first work request may be provided three (3) work items, a second work request provided 10 work items and a third work request provided seven (7) work items, with no connection between the number of work items provided to the different requesting nodes. Those numbers may simply be pre-programmed into the respective nodes as the chunk size of work items to request from a GCQ, with some consideration given for the latency of operations on the system interconnect fabric and at the local processing node.

Once the work items are returned to the processing node, the work items are stored within the LCQ. Each node is then responsible for tracking the completion of the particular work elements within their respective local queues. Notably, while the description of the illustrative embodiment is directed to operations on a single work element within a single entry of the LCQ, other embodiments provide that each LCQ may include multiple entries, with each entry mirroring those of the GCQ, but including only a subset of the work items retrieved from the GCQ. With this multiple entry configuration of the LCQs, an idle processing unit may move on to the next work element in the LCQ, rather than having to go to the GCQ for work when all work items of a first work element in the LCQ have been dispatched. This embodiment also allows for the processing units to not become idle when additional work is available from other work elements within the GCQ, for which the processing node has been approved for execution. By retrieving portions of multiple work elements from the GCQ and staging those work element portions within the LCQ, the latency involved in replacing a completed entry of the LCQ with new work items from the GCQ does not cause the local processing units to become idle, unless there is no more work available at the GCQ.

When a single architecture of assigned processing units includes both low latency processing nodes as well as high latency processing nodes, a hybrid model of work dispatch may be implemented, in one embodiment. Thus two different mechanisms are concurrently implemented for scheduling work to processing nodes within the single processing system, with high latency nodes tagging their assigned work items in a LCQ, while processing units of the low latency nodes executing work items retrieved directly from the GCQ, with no local staging required. With this hybrid model, the processing units of low latency nodes grab work for themselves, while a singe processing unit of the high latency nodes grabs work for multiple other pre-selected processing units on the same high latency node.

Figure 13:
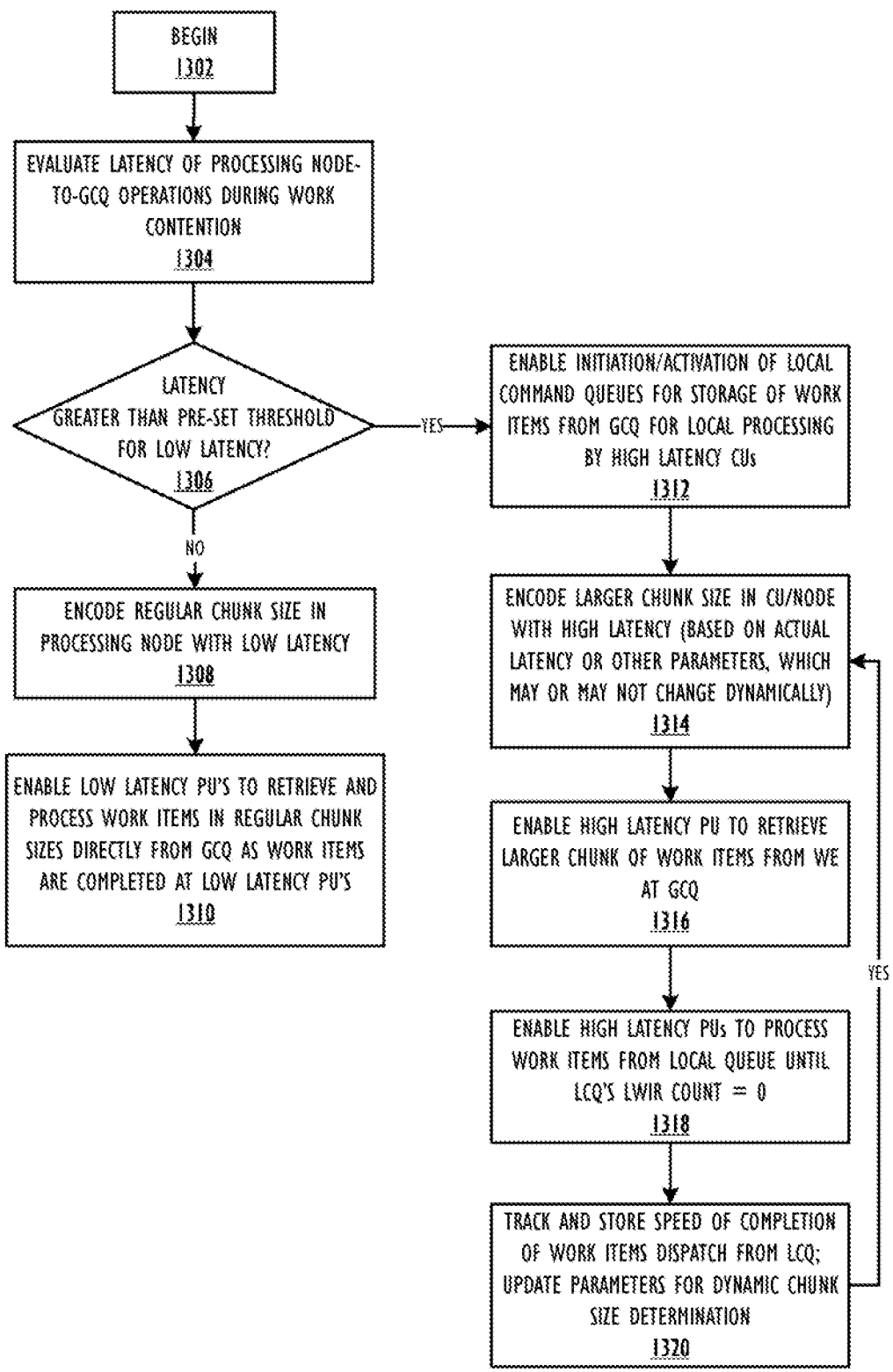
FIG. 13 is a flow chart of the method by which work is retrieved from the GCQ and executed at first processing nodes with low access latency to the GCQ and second processing nodes with high access latency to the GCQ, according to one embodiment.

Referring now to FIG. 13, there is provided a flow chart of the method by which the hybrid model of work dispatch among processing units with different access latencies to the GCQ may be implemented, according to one embodiment. The process begins at block 1302 and proceeds to block 1304 at which the local node logic (or LCQ logic) evaluates the latency of exchanges between the processor node and the GCQ during work contention and retrieval. At decision block 1306, the node logic determined is the latency is greater than a pre-establish threshold latency for low latency operations. This pre-established threshold latency may be a design value provided for the overall system or for the particular processing node and/or specifically for GCQ work dispatching operations.

If the latency is not greater than the threshold latency, then the node logic encodes the node with a regular chunk size for work request operations from the GCQ, as shown at block 1308. This encoded chunk size is then provided within each subsequently issued work request sent to the GCQ, and the low latency processing units are enabled to retrieve and process work items as regular chunks directly from the GCQ, as shown at block 1310. Returning to decision block 1306, when the latency is greater than the pre-set threshold latency for low latency operations (i.e, the processing node is a high latency processing node), the node logic initiates the establishment and/or set up of a local command queue for temporary storage of work items retrieved from the GCQ, as provided at block 1312. The localized determination of the latency to the GCQ may be based on pre-determined and/or pre-stored latency values to different locations within the overall system architecture. Thus processing node C 1010C may be pre-programmed to treat any work retrieved from a GCQ located within a different localized grouping of resources as requiring a higher latency for GCQ operations. Conversely, processing node C 1010C may also be pre-programmed to treat any work retrieved from a GCQ located within the same localized grouping of resources as having latency below the threshold latency and not requiring the establishment of a LCQ.

Returning to the flow chart, node logic of the high latency processing node encodes a larger chunk size in the processing node than for a low latency access to a GCQ, as shown at block 1314. The actual chunk size established may be based on a number of factors, as provide above, and may be dynamically changing. However, the chunk size may also be pre-set by the system designer (static allocation), in which case the LCQ may also be pre-established or may have a pre-established size (e.g., a pre-set number of entries for work storage). Once the chunk size is established/set, the node logic and/or the processing units requesting work from the GCQ encode the larger chunk size within the work requests in order to retrieve larger amounts of work to the high latency processing node, as shown at block 1316. At block 1318, the processing units within the high latency processing node then processes work items retrieved from within the LCQ until the LWIR of the LCQ reaches a zero (0) count. Notably, for embodiments in which the chunk size may be dynamically updated, the method further provides that the speed of work dispatch from the LCQ is recorded, at block 1320 and then that data is provided back to the evaluation and encoding of the larger chunk size (block 1314) for use in retrieving additional work items for the high latency processing node.

The manner in which work is retrieved by the high latency processing nodes in chunks and work completion is notified to the GCQ at the end of the local dispatch from the LCQ affects the processing by the GCQ logic in tracking work items for work elements within the GCQ. Thus, at the GCQ, when a larger chunk is requested and dispatched to the high latency processing node, GCQ logic decrements the total amount of work items remaining for dispatch once per larger chunk size, rather than each time, as required with the smaller sized (standard) chunks that may have been initially accounted for by the compiler in scheduling the work element. Also, for work dispatch occurring at the granularity of the processing units (rather than at the node level), the GCQ seen count of the work element is decremented by the total number of processing units at the high latency processing node rather than by a unitary decrement.

Returning to the sequence of FIGS. 6A-6D, and looking specifically now at FIGS. 6E-6F, there is illustrated an example process by which an approved high latency processing unit removes its chunk size of work from the GCQ, specifically WE_1. WE_1 initially has 100 work items for scheduling/dispatch and an APU masks that assumes there are 10 individual processing units in the system from seven units are approved units to which work items may be dispatched (or on which work items may be scheduled). Among the seven approved processing units are processing units 671 and 673 of high latency processing node 1010C.

As provided by FIG. 6E, the processing units that are not approved for processing WE_0 may also concurrently schedule work from a different work element at which the processing unit is approved. At FIG. 6E, a first local processing unit (e.g., processing unit 1 xxx at low latency processing node A 1010A) requests work items and receives a chunk size of 10 work items for dispatch. The WIR counter associated with WE_1 is decremented to reflect the scheduling of the 10 work items from WE_1, and the seen count is decremented by 1 (from seven (7) to six (6)). When a work request from a processing unit of high latency processing node 1010C is processed by GCQ logic, a larger chunk size of 40 work items is scheduled on and dispatched to the LCQ of the high latency processing node. GCQ logic subsequently decrements the WIR counter from 90 to 50. The seen count of WE_1 is however not decremented until the scheduled work items are dispatched from within the LCQ, as described below with reference to the method of FIG. 15.

According to one embodiment, the LCQ tracks the PU mask of the various processing units within the high latency processing node, so that the LCQ represents a combined mask that represents all of the local processing units. Once execution of the 40 work items within the LCQ is completed, i.e., the LWIR count equals or is less than zero (0), the LCQ logic issues a completion notification, which triggers the GCQ logic to decrement the seen count of WE_1 by two (2), which corresponds to the number of processing units that shared in the execution of the 40 scheduled work items on LCQ.

Once the work items are stored within LCQ, the local processing units may begin executing the work items from within LCQ. When the second processing unit of the high latency processing node initiates execution, the second processing unit looks at the LCQ to check if there is work locally stored for dispatch. Thus, rather than taking the longer latency approach to retrieve work from GCQ with the contentions involved at the GCQ, each local processing units first looks to the LCQ and takes work items from the LCQ if work is present within the LCQ. The local processing unit requests one or more work items (up to an internal/local chunk size) for execution, and the LCQ logic dispatches the next in sequence work items to local processing unit and automatically decrements the LWIR by the local chunk size of work items provided to the local processing unit. When the local processing units complete the locally stored work, the LCQ logic forwards a notification to GCQ logic to decremented the seen count. Also, if the LCQ detects that a next local processing unit issues a request for additional work, while the LWIR count is less than or equal to zero (for each locally stored portion of work elements for which the requesting processing unit is approved), the LCQ forwards the new request to the GCQ.

When the work in the LCQ is completed, a new work request will be submitted to again pull a large chunk of work from the GCQ into the LCQ. Again, work is only dispatched from a work element for which the processing units are pre-selected execution units on which to schedule work items from the work element. The work request is thus advanced to the next queue element(s) in sequence until the PU mask of the specific processing unit matches the PAU mask of the work element.

Figure 14:
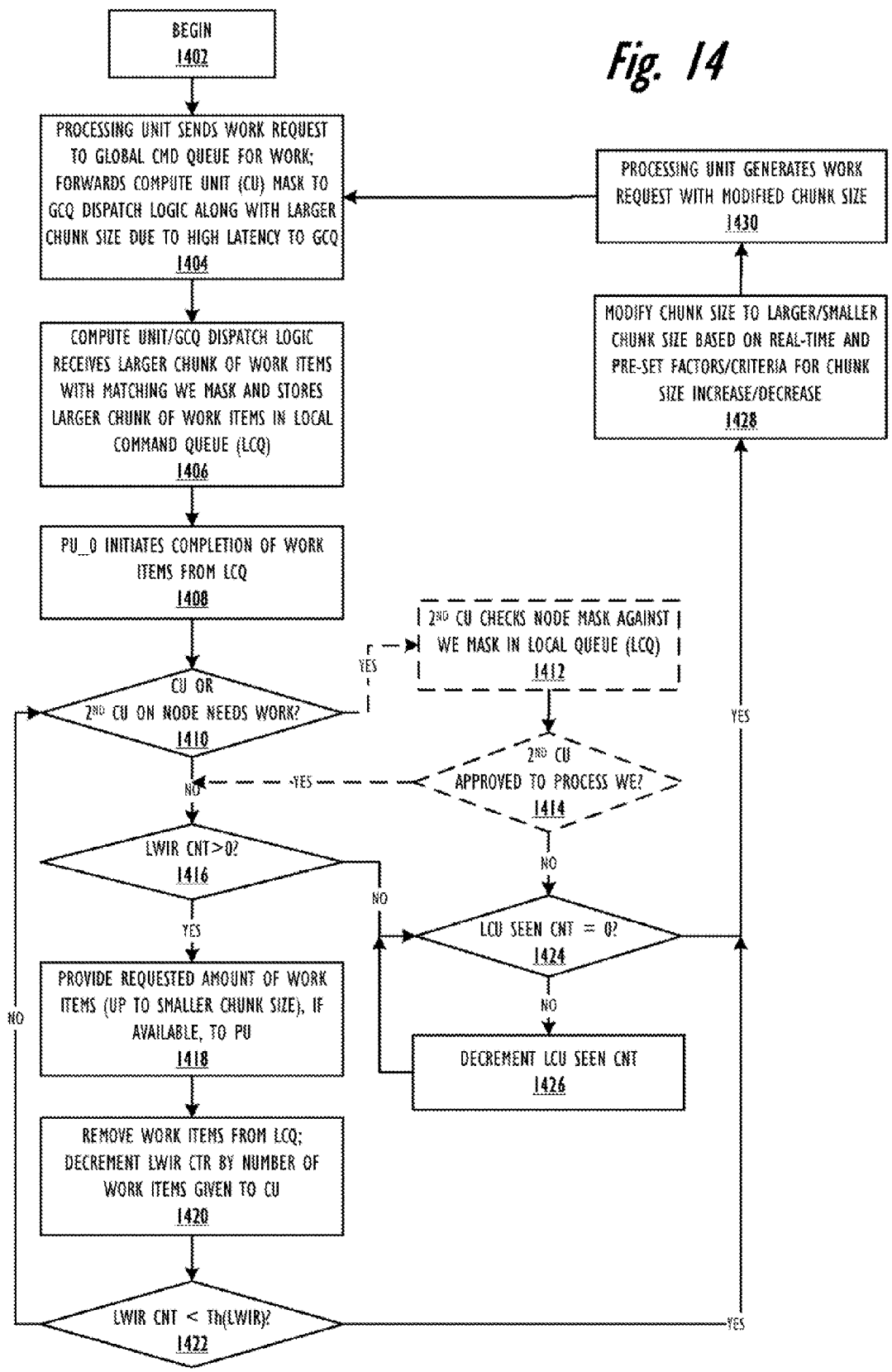
FIG. 14 is a flow chart of the method by which processor cores of the high latency processor node execute work items from the local work queue, tracks the amount of work items remaining within the local work queue, and issues requests to retrieve additional work from the GCQ for the processor node, according to one or more embodiments.

As with the GCQ tracking mechanisms described above, LCQ logic implements a local tracking mechanism to track work consumption from the LCQ by the different approved execution units at the high latency processor node. The flow chart of FIG. 14 illustrates certain features of the method by which this local tracking occurs, and the method is described from the perspective of the processing units and/or LCQ logic performing various operations. The process begins at block 1402 and proceeds to block 1404 at which a processing unit, e.g., processor core0 1171 forwards/transmits a work request to the GCQ for work. The work request includes the PU mask as well as the larger chunk size. At block 1406, the processing unit (or general work dispatch logic of the processing node) receives the larger chunk size of work from the GCQ and stores the work items in the LCQ. The first requesting processing unit initiates completion of work from the LCQ, at block 1408. A determination is made at block 1410 whether the first processing unit or another/second processing unit on the high latency processing node needs work. If one of the processing units on the high latency processing node is in need of work, and the granularity of the work assignment is at the processing unit level (versus the processing node level), the LCQ logic compares the PU mask against the APU mask (or partial APU mask) for a match at the LCQ, as shown at block 1412. At decision block 1414, LCQ logic determines whether the requesting second execution unit is approved to process work items for the current work element being executed. When the result (of the PU versus APU comparison) is a negative, the second processing unit may remain idle (or processes local work) until a later set of work items are provided within the LCQ for which the second execution unit is approved.

If, as determined at block 1414, the requesting processing node is approved at the LCQ to process work items stored within LCQ, then the LCQ logic checks at decision block 1416 whether there is any remaining work item within the LCQ (i.e., whether LWIR count is greater than zero (0)). In one embodiment, a periodic determination is made whether the LWIR count equals zero, indicating that the staged work items have all been dispatched from the LCQ. When there are still work items remaining to be executed, the LCQ logic provides the work items to the requesting processing unit, as shown at block 1418. Also, as work items are forwarded to the approved processing units at the high latency processing node, the LCQ logic decrements the LWIR counter, as shown at block 1420. The amount of work items processed by the executing unit may be a chunk size greater than one, and the decrementing of the LWIR count factors in the exact number of items that are removed from the LCQ. It is important to note that the "LWIR count=0" condition may be artificially prevented by ensuring that a next work request is forwarded to the GCQ with sufficient time (with consideration give to the latency of return of work items) to re-stock the LCQ prior to completion of execution at the high latency processing node of all of the previously-received work items stored within the LCQ. The LWIR counter may thus be decremented as provided above, but also incremented as the new batch of work items are received from a second, subsequently issued work request with updated chunk size. Thus, as provided at decision block 1422, LCQ logic determines when the LWIR count is less than a pre-established (or dynamically calculated)

LWIR threshold (TH$_{LWIR}$). When the LWIR count is less than the TH$_{LWIR}$, the process proceeds to block 1428, which is described below.

Returning to decision block 1416, If the LWIR count is not greater than zero (i.e., LWIR counter holds a value that is less than or equal to zero), LCQ logic checks at block 1424 whether a local seen count is equal to zero. When the seen count is not equal to zero, LCQ logic decrements the local seen count by one, as provided at block 1426. The local seen count represents the total number of processing units within the high latency processing node. In one embodiment, the seen count is decremented as each processing unit is seen by the LCQ logic to prevent a processing unit from inadvertently retrieving new work items for a different work element without being made aware that the new work items are no longer a part of the previous set of work items processed. Thus, when the LCQ is empty, the node ensures that all processing units are made aware of the fact that the particular work set has been completed.

When the local seen count equals zero (0) or when the LWIR count is less than TH$_{LWIR}$, the LCQ logic determines whether a modification of the chunk size is required and modifies (increases or decreases) the chunk size, as required, at block 1428, The modification of the chunk size is based in part on the detected performance of the processing node dispatch of the work items within the LCQ. Then, at block 1430, a new/second work request is generated with the modified chunk size and the new/second work request is forwarded to the GCQ. Also, LCQ logic forwards a seen count update notification to the GCQ logic to update the seen count of the work element within the GCQ.

Figure 15:
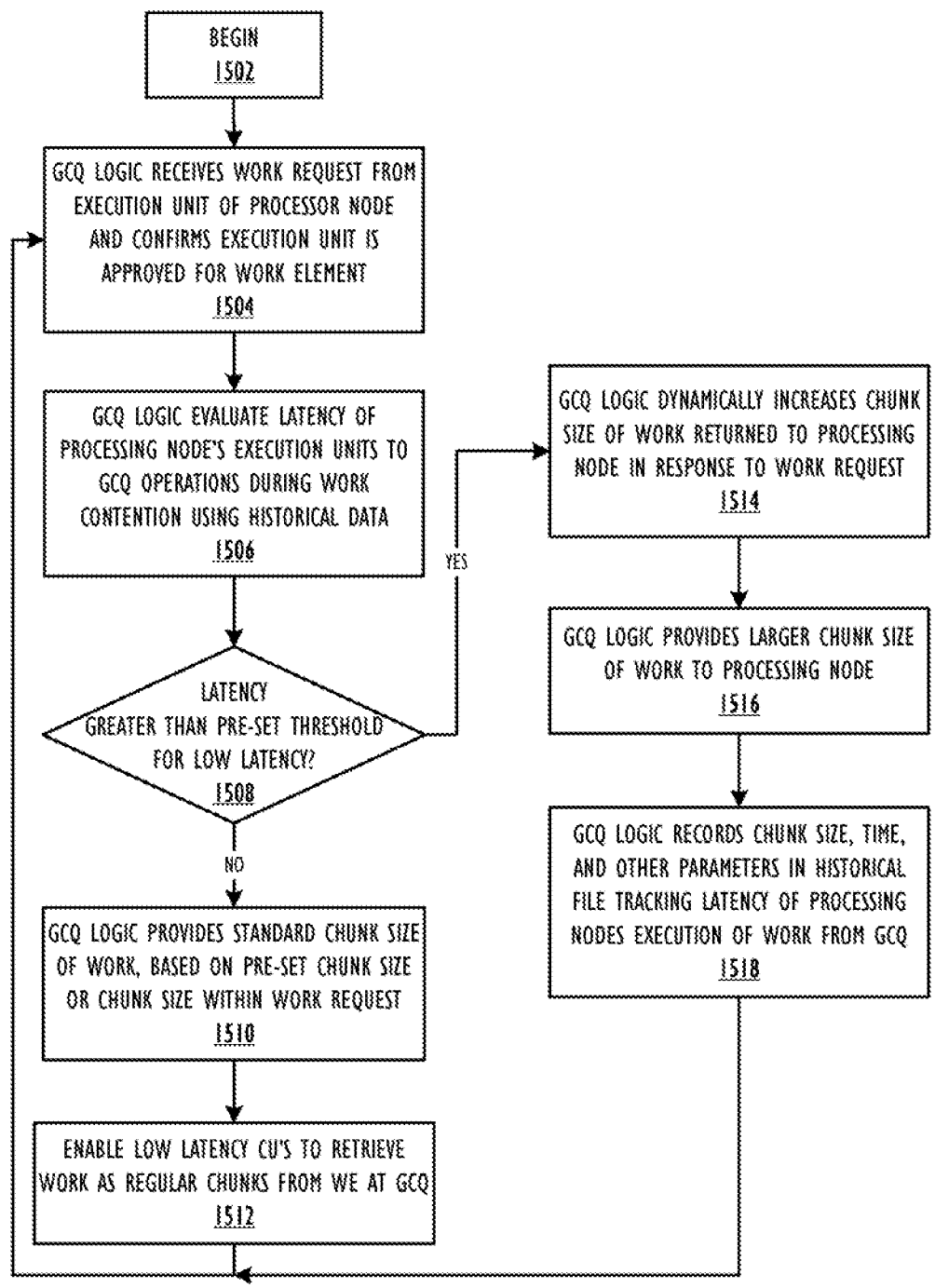
FIG. 15 is a flow chart of the method by which the GCQ logic dynamically calculates the chunk size of work to forward to a high latency processing node requesting work from a work element, according to one embodiment.

The functionality exhibited by GCQ logic enables certain of the described features to be dynamically implemented. FIG. 15 provides a flow chart of the method by which GCQ operations are performed during work dispatch to an LCQ of a high latency processing node, including determination of an appropriate chunk size and subsequent updating of work element variables as the work is completed at the high latency processing nodes. The process begins at block 1502 and proceeds to block 1504 which shows GCQ logic receiving a work request from an execution unit of a processing node and confirming the execution unit is an approved execution unit for the specific work element being dispatched and/or scheduled. At block 1506, GCQ logic evaluates the latency associated with the processing nodes operations on the system interconnect in requesting and dispatching work from the GCQ. In one embodiment, GCQ logic relies on stored historical data and retrieves the stored historical data corresponding to that processing node from the storage location. GCQ logic compares the latency of operations to a pre-set low threshold latency and determines at decision block 1508 whether processing node's latency is greater than the pre-et threshold latency. If the latency is not greater than the threshold latency, the GCQ logic provides a standard (or requested) chunk size of work in response to the work request from the processing node, as shown at block 1510. The GCQ logic then enables low latency retrieval of work by the processing node from the GCQ as regular chunks of work, as provided at block 1512. However, if at decision block 1508, the processing node's latency is greater than the threshold latency, GCQ logic dynamically increases the chunk size of work to schedule for return to the processing node in response to the work request, as provided at block 1514. GCQ logic then provides/schedules the larger chunk size of work to the high latency processing node at block 1516. At block 1518, GCQ logic then records the chunk size scheduled, time of dispatch, and other parameters in a latency tracking history database. The database may include information for a multiple of processing nodes that access the GCQ to retrieve work for local consumption/execution.

According to one embodiment, work is scheduled as follows: (1) an execution unit checks the LCQ to see if the work element is populated within the LCQ. If there are no work items remaining within the LCQ, the execution unit next checks to see if work is being fetched by another one of the local execution units. If work is being fetched by another execution unit's issued work request to the GCQ, the execution unit waits while the work is being fetched. However, if no work request has been issued from the processing node to fetch additional/new work, the execution unit issues a work request to trigger fetching of additional work from the GCQ. When there is work in the LCQ and that work is assigned to the requesting execution unit, the WIR counter within the LCQ is decremented by the work size grabbed by the requesting execution unit. When the WIR counter is still positive after the decrement, each remaining work item will continue to be scheduled/dispatched sequentially.

In one embodiment, the process of fetching work involves the following methods: the execution unit atomically sets a bit within the LCQ or generally within the processing node to signal that work is being fetched. The CGQ logic decrements the remaining work items of the work element in the GCQ by the amount/size of the allocated work. The chunk size assigned to the LCQ is larger than the work size of the execution unit, thus ensuring that more than one execution cycle is provided within the amount of work assigned to the LCQ. If the work items remaining counter in the GCQ is still positive after the decrement, the local work items remaining (LWIR) count in the LCQ is incremented by the chunk size. Otherwise, if the WIR count at the GCQ is negative, the seen count is decremented by 1 (for a node level APU mask implementation) and by the number of local processing units at the high latency processing node (for a processing unit level APU mask implementation).

According to a first embodiment, the local seen count is decremented from the total number of local processing units within the high latency processor node to zero (0). In an alternate, second embodiment, the local seen count is incremented from zero (0) to the total number of local processing units. The former/first embodiment provides that the GCQ logic decrements the seen count at the GCQ by the predetermined total number of processing units when the LCQ logic forwards a signal indicating that all local units have seen the particular work element. With the later, second embodiment, when the local seen count is equal to the number of execution units in the high latency processing node, the work element's seen count within the GCQ is decremented by the associate local seen count. When the work element's seen count within the GCQ reaches zero (0), i.e., the pre-set number of (approved) cores in the entire system have seen the work element once, the GCQ entry holding the work element is tagged as being free for use. The scheduler may then schedule a next work element in the GCQ entry.

The described embodiments enables OpenCL execution of ND Range work elements, in which each node is capable of completing work without updating the other nodes. To provide an ND Range across scheduling LCQ's on multiple processing nodes that are "far" apart (i.e., nodes with high cross synchronization access latencies), the process simplifies to tracking the "head element" that contains the global queue count. Then, instead of only marking the element as complete, the described embodiments provide for making an additional check to see if there is a "head element".

D. Decomposition of ND Range Multi-Dimensional Work Set for Efficient Work Dispatch to Processing Unit(s)

Certain of the features of the above described embodiments are implemented on work that is initially represented as an N Dimensional (ND) Range work set, which comprises a command and an ND Range configuration of operands. The above embodiments would therefore involve managing the scheduling and execution of work sets in this ND Range processing scheme, such as provided by OpenCL™ and other similarly structured languages/framework, which allow execution on multiple execution units within a multi-node heterogeneous (or homogeneous) data processing system architecture. OpenCL, for example, enables a programmer to write compute kernels as well as APIs for creating and managing these kernels. The compute kernels are compiled, with a runtime compiler, which compiles the kernels on-the-fly during host application execution for the targeted processing units.

With the ND Range processing scheme, one or more execution commands perform a recursive function over a structured set of operands (e.g., data), which are arrange in an ND range (e.g., a two (2) or three (3) dimensional configuration). In one embodiment, the commands themselves contain the information necessary to efficiently execute and balance work load generated by the command, and each command includes information required for execution of the ND Range work set as a single dimension work element, while enabling the re-construction of an ND range output from the individual work items within the single dimension work element.

As utilized herein, an ND Range operand refers to a single positional entity (which may be one or more data points) located at a specific one of the index position within an ND Range work set (e.g., entry at 3,2,2 in a three dimensional range work set) on which a command is performed by a processing unit to yield a resulting work output. The ND Range operands are each represented in a one dimension work element of the GCQ by an individual work item which is arranged in particular ordered sequence relative to the other work items.

Execution of an ND Range command requires navigating the command function through multiple dimensions of operands decomposed into a single dimension work elements containing one work item for each operand. The ND Range operands of a single command may be contained within a single work element hosted within a single GCQ entry, as provided in the illustrative embodiments. However, alternate embodiments allow for work items of a single work element to be scheduled via multiple entries of the GCQ, rather than within a single entry. Each work element thus contains a command and an array of work items decomposed from an ND Range work set. It is appreciated that no decomposition occurs when the original work set is a single dimension work set.

Within this ND Range execution scheme, and according to the presently described embodiments, execution units process the commands retrieved from the GCQ (or from the LCQ for high latency processing nodes), corresponding to the ND Range operands. Within the GCQ/LCQ, each entry holds a work element (or work group) or portions of a work element, which comprises multiple work items that are dispatched for execution by specific processing units identified by an APU mask assigned/linked to the work element. According to the illustrative embodiments, the entries within the GCQ provide a single dimension array from which all work items of the corresponding work element are dispatched or scheduled in an ordered sequence. Also, as provided by the above described embodiments, the execution units are processor cores, which may be located across a distributed network, including multiple processor nodes. However, while processor cores are employed throughout the described and illustrative embodiments as the examples of execution units, in other embodiments, the execution units may be any device or execution structure capable of executing a command, including, but not limited to, processing codes, CPUs, threads, accelerators, and even complete computing systems.

In order to efficiently schedule and dispatch am ND range command, and particularly, for a multi-dimensional (more than one (1)) range command (i.e., a command operating on an multi-dimensional configuration of operands, methods are provided herein that enables the multi-dimensional work set to be decomposed and "reconfigured" or "re-arranged" into a single dimension work element. The single dimension work element enables efficient scheduling and/or reservation and dispatching of work in a single dimension (1D) range, without the processing units having to account for multi-dimensional indices for each operand. As provided by the illustrations of FIGS. 16A and 17A, the multi-dimensional work set is re-arranged by compiler and/or ND Range Work Scheduling (WS) logic 1600 into a representative single dimension array 1620/1720 having a determinable total number of work items arranged in a descending or ascending sequence. For simplicity in the describing the illustrative embodiments, ND Range Work Scheduling (WS) logic is referred to simply as "WS logic". WS logic as utilized includes first logic for decomposing the ND range work set into the single work element as well as second logic for generating an ND Range output from the work output results provided by the processing units executing the work items of the work element.

In the described embodiments, the total number of work items is equal to the total number of ND Range operands and is calculated by multiplying the size of each dimension with each other. Thus, for a two dimension range with an X and Y dimension, the total number of work items is calculated as X*Y (X multiplied by Y), while with a 3D range having a Z dimension in addition to the X and Y dimension, the number of work items is calculated as X*Y*Z. The result (R) of this calculation is then used as the Total Number (TN), which is stored and later utilized during scheduling operations as well as generation of the ND range output. Within the various illustrations and descriptions thereof, the individual work items are labeled from 0 through TN−1 (e.g., 16 work items, numbered 0 through 15).

Figure 16A:
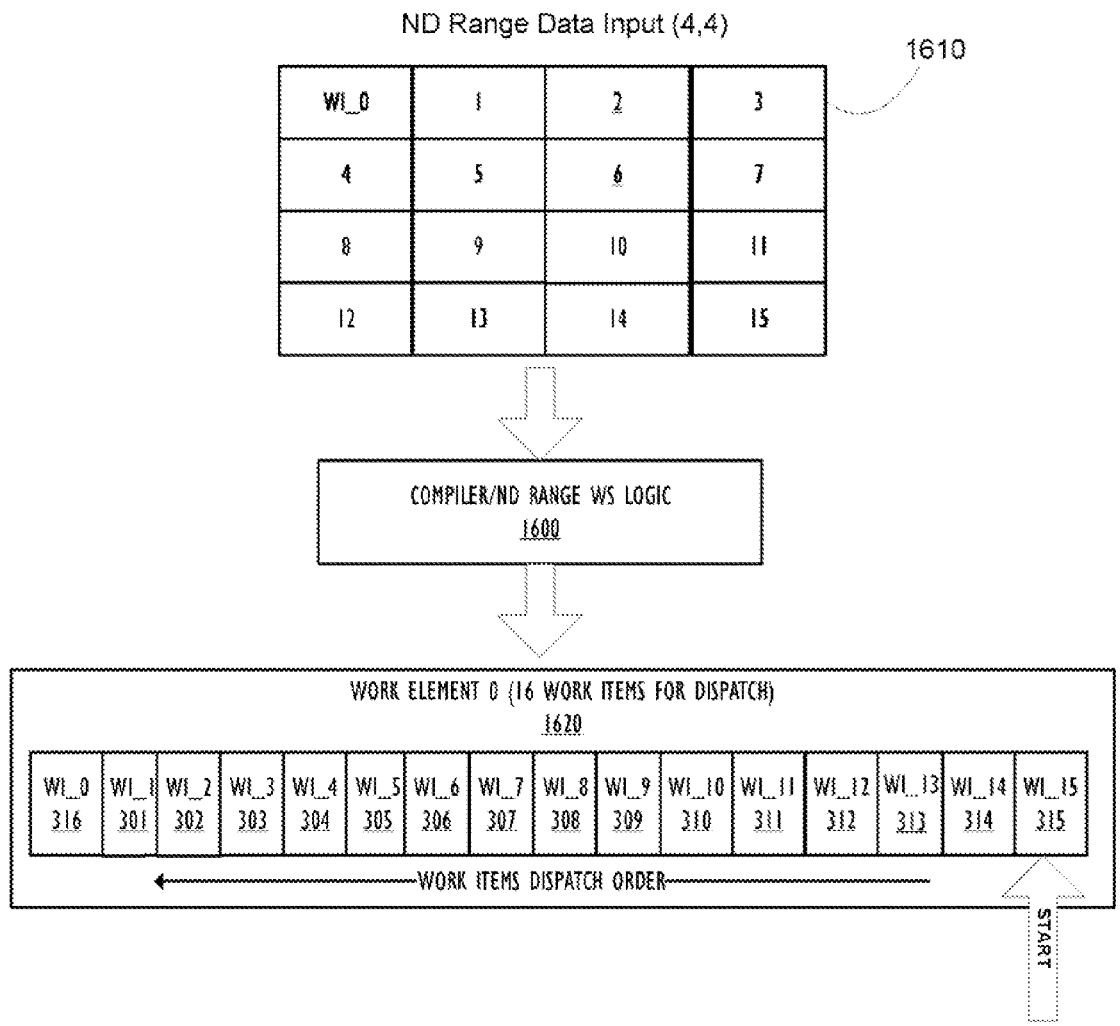
FIG. 16A illustrates the decomposition of a 4×4, two (2) dimensional (2D) range work set by a compiler/ND Range decomposition logic (logic) into a single (one) dimensional work element (array), according to one embodiment.

Referring specifically to FIG. 16A, there is illustrated a 2D work space that is decomposed into a work element made up of a 1D array of work items. Two dimensional work set 1610 comprises 16 work items, labeled work item_0 (WI_0) through WI_15. The original 2D work set 1610 contains operands that are arranged in a 4×4, two dimensional arrangement starting with index location 0,0 through index location 3,3. While illustrated as a 4×4 arrangement, it is appreciated that another embodiment of 16 work items in a 2D arrangement may provide for a 2×8 or 8×2 arrangement of the individual work items, with locations 0,0 through 1,7 or locations 0,0 and 7,1, respectively. It is assumed for the purpose of discussion that only 2D range and up (e.g., 3D, 4D) work sets, i.e., not 1D work sets, are being described herein, as no decomposition is required for a 1D range work set, in most embodiments. Also, while the illustrative and described embodiments provide for a symmetric and complete distribution of operands items within the ND Range, i.e., the same number of operands for each row/column in each dimensional space, the features described herein are fully applicable to non-symmetric distribution of operands within the ND Range. For example, a 2D (X*Y) work element may be provided in which 14 work items are arrange as a first row of 8 work items along the first dimension (X) and a second row of 6 work items along the same dimension (X), such that the Y dimension has an unequal number of work items (one in some places and two in others) relative to the X dimension.

Returning to FIG. 16A, compiler/WS logic 1600 receives program instructions for generating a ND Range command, which command operates on 2D (4×4) configuration of operands 1610. The downwards pointing arrows indicate the directional flow of the processing performed by the compiler/WS logic 1600. When the instructions are received, compiler/WS logic 1600 generates the ND range command(s)/kernel(s), and WS logic performs a decomposition of the 2D configuration of operands 1610 into a single dimension work element 1630 having multiple sequentially ordered work items. As shown, single dimension (1D) work element 1630 has 16 work items arranged linearly from WI_0 through WI_15 (where 15 equals TN−1). These work items are associated with WE_0, introduced above as occupying a first entry of GCQ (320, FIG. 3).

Figure 17A:
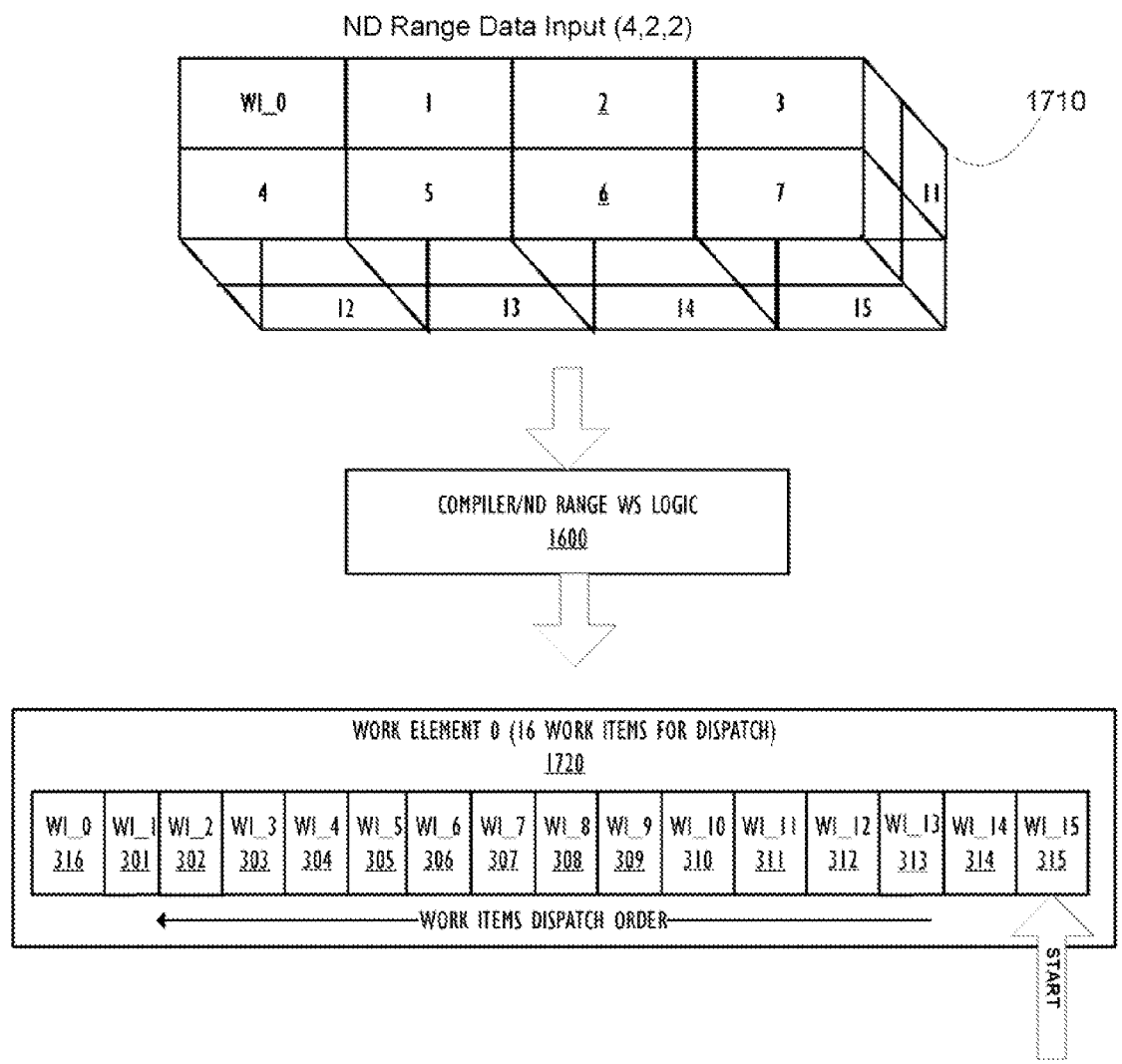
FIG. 17A illustrates the decomposition of a 4×2×2, three (3) dimensional (3D) range work set by a compiler/logic into a single (one) dimensional work element (array), according to one embodiment.

FIG. 17A illustrates a similar decomposition of a 3D Range configuration of operands with an original ND indices of 4×2×2. The arrows indicate the directional flow of the processing performed by the compiler/WS logic 1600 to generate the ND range command and single dimension work element. Compiler 1600 receives the program instructions and generates the corresponding ND range command(s)/kernel(s). WS logic 1600 then decomposes the 3D range of operands 1710 into a corresponding 1D work element 1730. As with work element 1630, work element 1730 comprises 16 work items arranged linearly from WI_0 through WI_15 (where 15 equals TN−1). These work items are again associated with WE_0, introduced above as occupying the first entry of GCQ (320).

Figure 18:
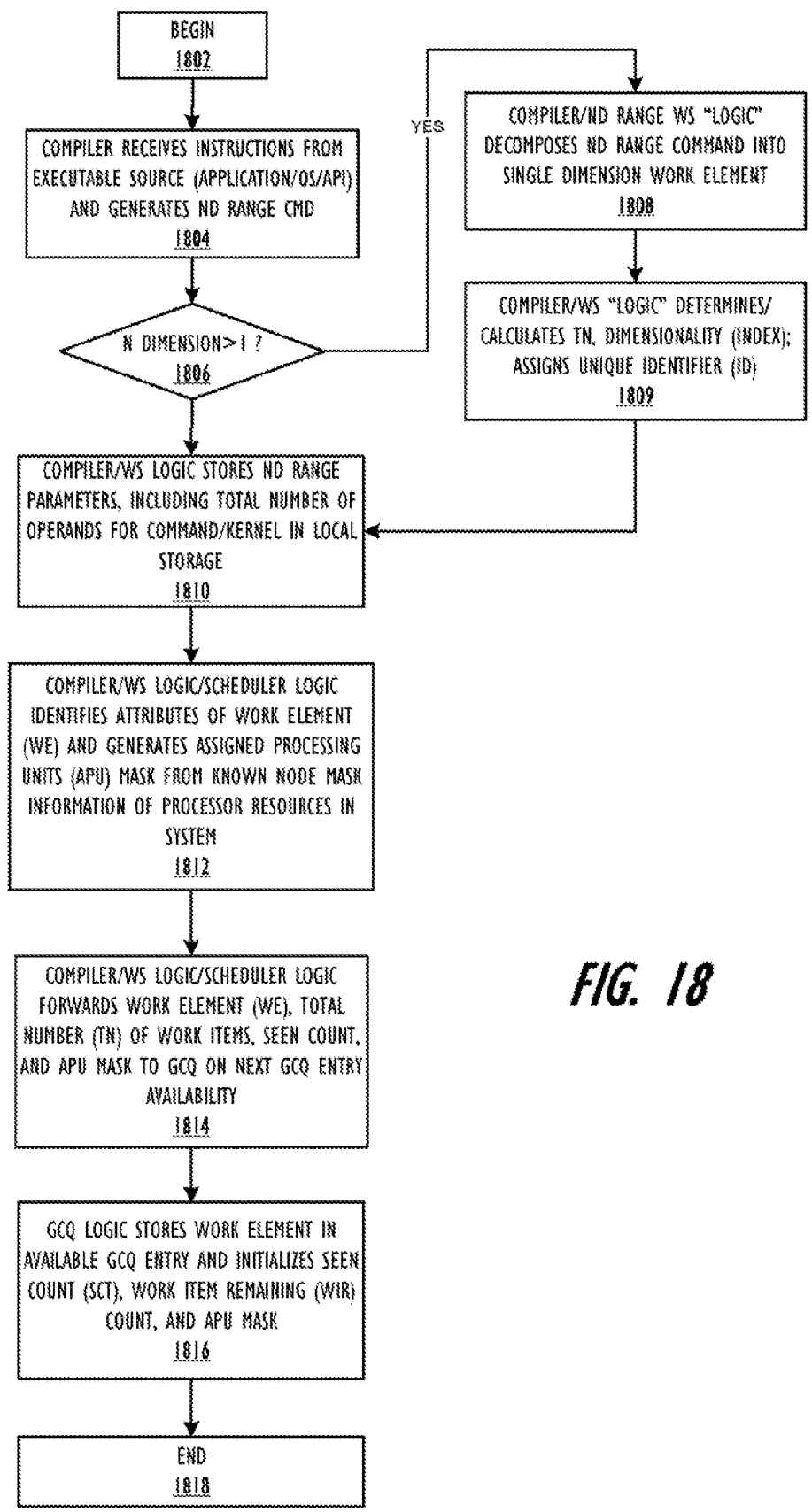
FIG. 18 is a flow chart of the decomposition of a multi-dimensional range work set into a representative one-dimensional work element for efficient dispatching of work items to multiple processor cores, according to one embodiment.

During decomposition of the ND Range command/operands, WS logic 1600 stores the size of each dimension, i.e., number of operands along the X and Y dimension for 2D and X, Y and Z dimension for 3D. WS logic 1600 also calculates and stores the total number (TN) of individual work items generated from the decomposition. These values are stored along with a unique identifier (ID) of the work element (WE_0) to which the values correspond. Storage of these and other parameters of the ND range command enables compiler to later re-configure/re-composes/generate the ND Range output from the individual work items. The flow chart of FIG. 18 provides an example method by which the compiler/WS logic 1600 operates on a received program instructions associated with an ND Range command to generate the single dimension work element(s).

The method begins at block 1802, and proceeds to block 1804, which illustrates the compiler receiving the program instructions from the local runtime source (e.g., application 126), and generating, from the received program instructions, an ND Range command for an ND range work set. At decision block 1806, compiler/WS logic 1600 determines whether the number (N) of dimensions of the work set is greater than one (1), (e.g., a 2D or 3D, . . . work set). If the number of dimensions in the ND Range command is greater than one (1), WS logic 1600 decomposes the ND Range work set into a single dimension work element, as provided at block 1808. Then, as shown at block 1809, WS logic 1600 determines/calculates the specific parameters corresponding to the original ND Range work set, which includes a unique identification (ID) tagged to the generated work element, the dimensionality of the ND Range (i.e., number of operands across each dimension), and total number (TN) of operands within the work set. WS logic 1600 then stores the parameters within a local storage, as provided at block 1810. The local storage may be a persistent storage in one embodiment and memory in another embodiment. At block 1812, compiler/WS logic 1600 (or runtime scheduler) identifies other attributes and/or functional parameter associated with the generated ND Range command, including, for example, APU mask of processing units (or processor nodes) that are approved to execute the work element(s) generated from the ND range command. As described herein, the APU mask is generated by the compiler/runtime scheduler with masks bits set corresponding to the selected, approved processing units from among all the processing units/resources available within the system for selection to dispatch the work element.

When an entry becomes available within the GCQ, the compiler/WS logic/scheduler logic then places the generated single dimension work element in the GCQ, at block 1814, and the scheduler forwards several associated parameters or attributes of the work element to the GCQ, including the initial count of the total number of work items for dispatch (i.e., the initial WIR count) and the APU mask and the seen count. On receipt of the new work element at the GCQ, the GCQ logic stores the work element in the available GCQ entry, and the GCQ logic then initializes the seen counter value, WIR counter, and the APU mask associated with the particular work element, as provided at block 1816. WS logic/scheduler also forwards the unique ID that is associated with the command and links the unique ID to the work element. The process then ends at block 1820.

With the work element arranged as a single dimensional array of independently executed work items, a pre-selected block/chunk size of work can then be quickly allocated to the different processing units in sequential order of arrangement of the work items within the work element. Work is then scheduled by chunks/blocks of sequential work items in this 1D range work element, and the work items are each tagged with its numbered location in the sequence of work items that comprise the work element. Work is allocated in specific chunks so that the range of the allocated work and remaining work for allocation are easily calculated. Concurrent with the scheduling/dispatching of the work items, and as the block/chunk size of work items are assigned to a processing unit, the number of work items within the block is atomically subtracted from the WIR counter. The processing units are then aware of which work dimensions to grab work from the remaining sequence by making a single decrement in the 1D work space. This processing within a single dimension space makes scheduling or work more efficient, versus the more complicated marking of an ND Region and tracking of the multiple dimension indices with conventional systems. The single dimension work space also enables easier implementation of work scheduling/dispatching from a GCQ and/or a LCQ, as described herein. Processing of work in both the low latency processors and high latency processors is completed by executing the command on the select set (chunk size) of sequential work items arranged in a single dimension array.

Embodiments of the invention further allow for re-composition of the work output results from the execution of the work items to generate an ND Range output corresponding to the ND Range work set. To enable later processing of the work output results, one or more of the scheduler logic, GCQ logic, or WS logic assigns the unique ID (from the kernel/command) to the work element and a unique positional number for each work item within the single dimension array. The unique ID and positional number are both linked to the work items dispatched to the processing units and remain linked to the corresponding work output result generated when the work item is executed by the processing unit. Additionally, each work element is provided a WIR count value and total number (TN) value to enable the GCQ logic and/or the processing unit to identify the unique positional number for each work item dispatched to the processing unit. With the work output results being identified with this unique ID and the unique positional number of the work output results relative to each other, WS logic is then able to identify which work output results belong to the original ND Range command, and also determine the specific ND index position within the original ND Range configuration of ND range operands. An ND Range output having similar ND configuration as the ND range work set (configuration of operands) may thus be generated from the single dimension work output results. The re-composition/generation of the ND range output is further supported by the WS logic also storing the methodology utilized by a first algorithm in decomposing the original ND Range work set. Thus, all relevant ND Range decomposition parameters are stored in a persistent local storage or memory of the local processing system (see FIG. 1).

Figure 16B:
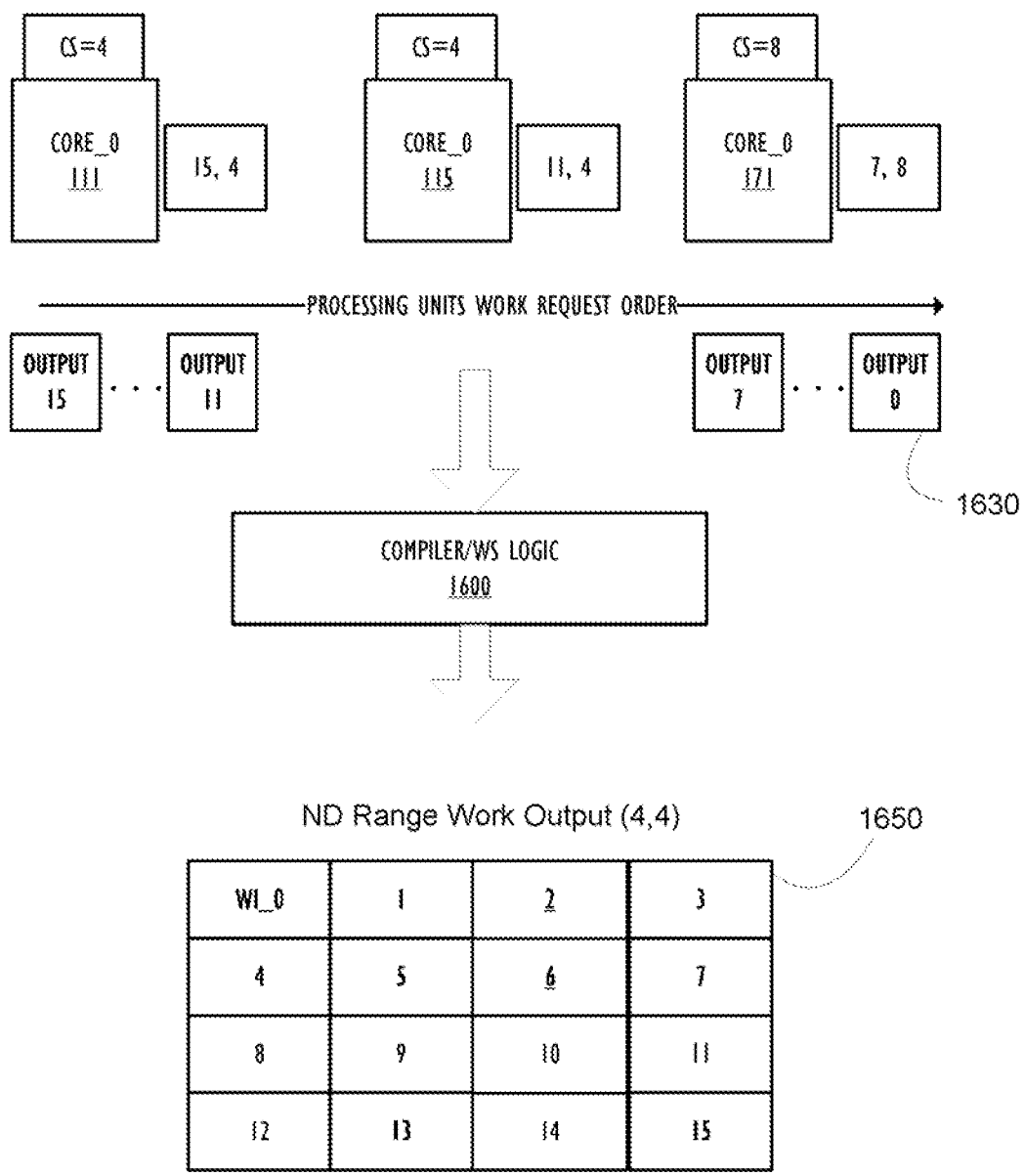
FIG. 16B illustrates sequential processing of the single dimensional work element (array) utilizing a combination of remaining work item tally and chunk size, and subsequent reconfiguration by the compiler/logic into a 2D Range output, according to one embodiment.
Figure 17B:
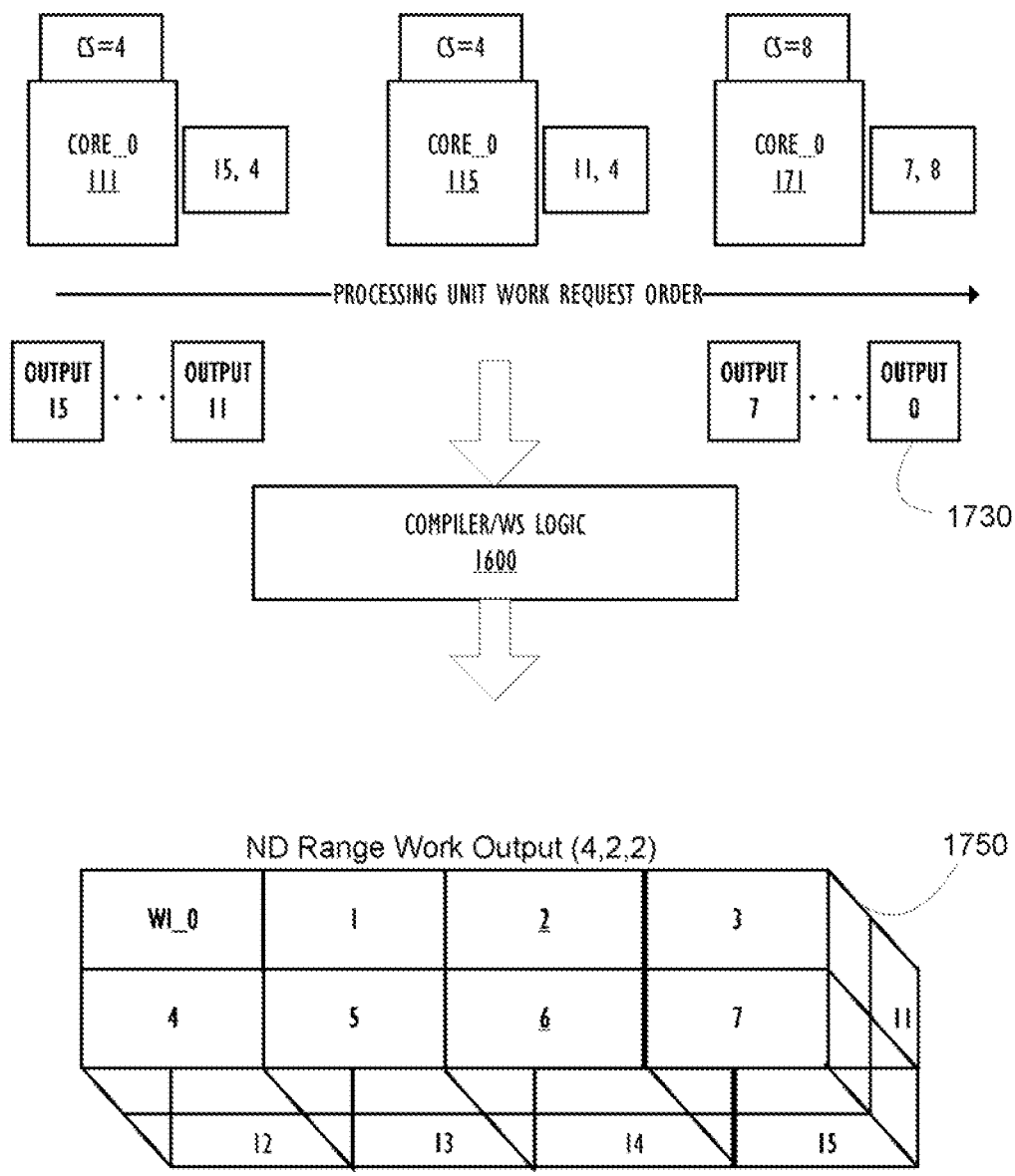
FIG. 17B illustrates processing by the processing units of the single dimension work element of FIG. 17A and subsequent reconfiguration/re-composition by the compiler/logic into a 3D Range output, according to one embodiment.

Referring now to FIGS. 16B and 17B, as well as FIGS. 19A-19F, there are provided a series of diagrams that illustrates the decomposition, work items dispatch, and re-composition processes of one or more embodiments described herein. Beginning first with FIGS. 16B and 17B, which generally show the processing units' generation of single dimension work output results from a 2D range command and a 3D range command, respectively, and subsequent re-combination of the single dimension outputs into respective 2D and 3D range outputs. With the 2D embodiment of FIG. 16B and 3D embodiment of FIG. 17B, the work items of WE_0 are scheduled for completion on three processing units, namely processor core_0 111, processor core_0 115, and processor core_0 171 (FIG. 1). During work allocation/dispatch/grabbing by the processing nodes, a particular chunk or grouping size is provided to the node, and that chunk size of work items is simple removed from one end of the single dimension work element, beginning with the last remaining work item and proceeding sequentially until the chunk size is allocated. The examples provide for a chunk size of four (4) work items for local (low latency) processing nodes and a larger chunk size of eight (8) work items for remote (high latency) processing nodes. The chunk sizes of work items are scheduled in sequential order from GCQ/LCQ on each processor core using a combination of the WIR/LWIR count and the chunk size.

Following processing/execution of the command on the particular work items at each processing unit, the processing unit forwards the work output results 1630/1730 to the WS logic 1600. Using the unique ID, the WS logic 1600 determines which stored parameters are associated with the work output results 1630/1730, and the WS logic 1600 retrieves other relevant parameters, including the total number of individual operands/work items, the original ND Range (index) configuration, and the specific algorithm utilized to perform the initial decomposition. These parameters are then provided to a second algorithm of WS logic 1600, which second algorithm generates resulting ND range outputs 1650/1750 from the single dimension work output results 1630/1730.

Figure 19A:
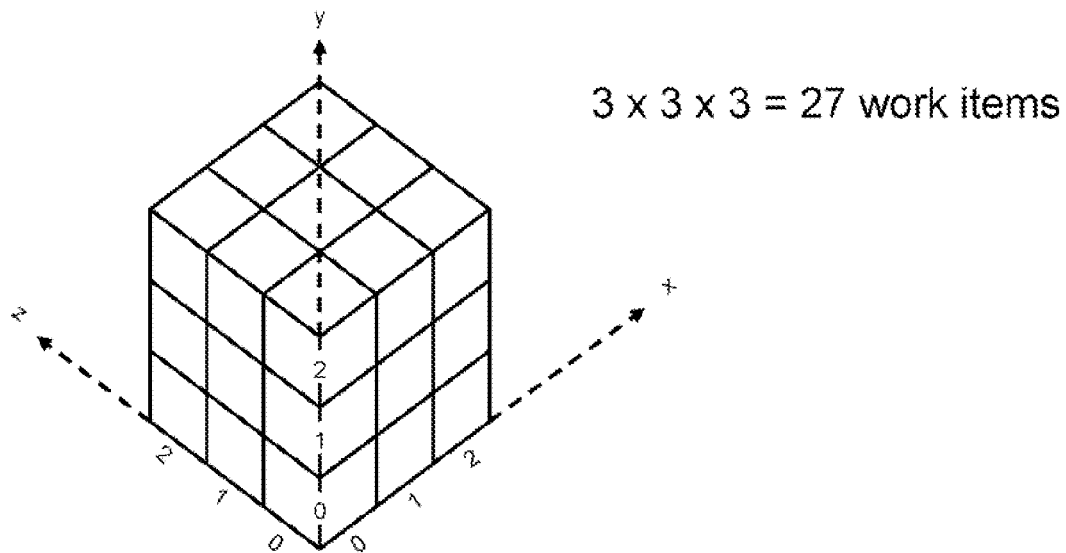
FIGS. 19A-19F provides a sequence of diagrams illustrating (a) the decomposition of a 3×3×3, three (3) dimensional (3D) range work set into a single dimension (1D) array (work element) of sequentially arranged work items and (b) subsequent sequential processing of the single dimension work element utilizing a combination of remaining work item tally and chunk size, in accordance with one embodiment.
Figure 19B:
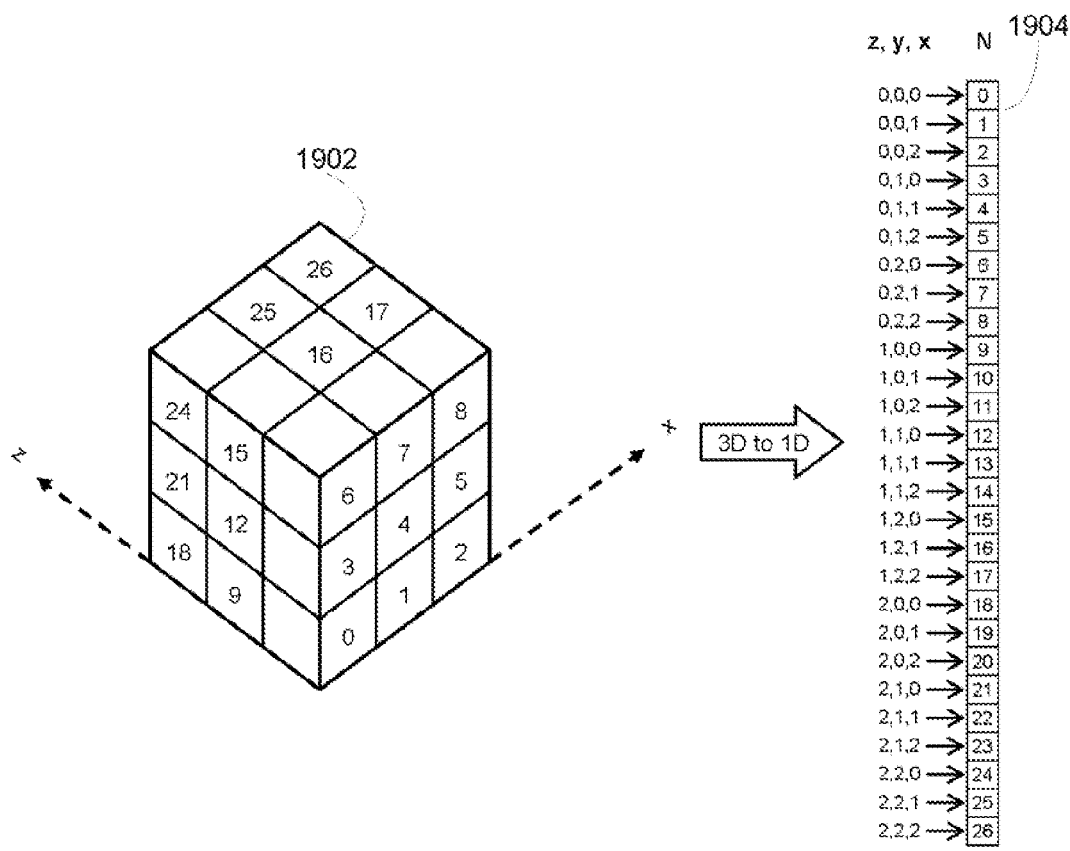
Figure 19C:
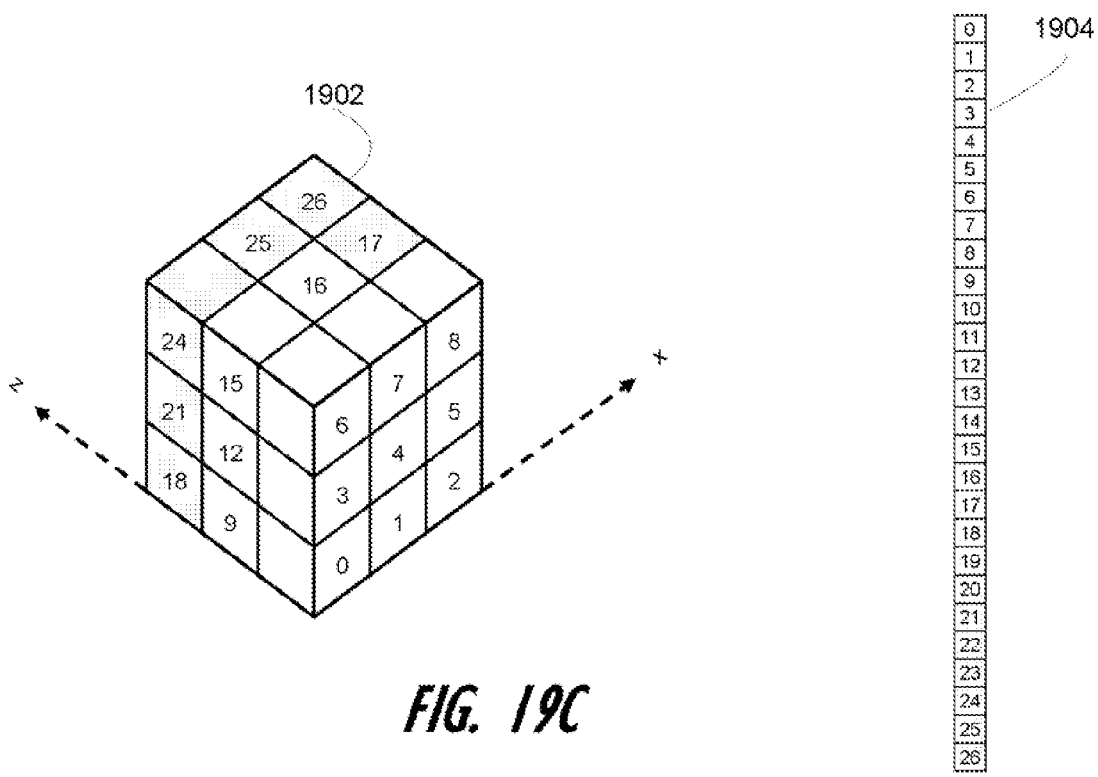
Figure 19D:
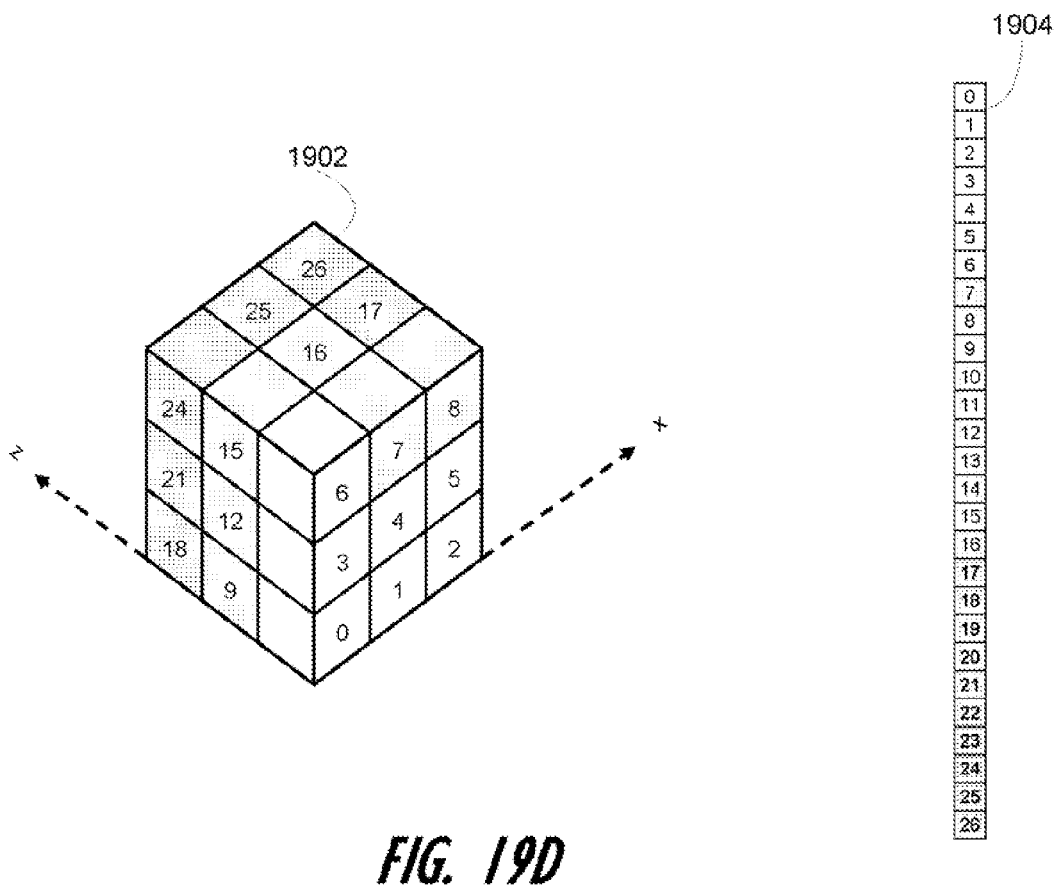
Figure 19E:
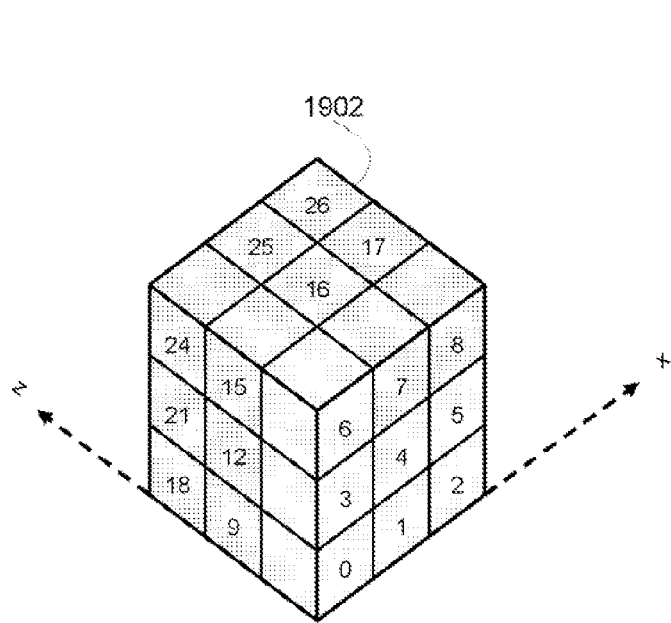
Figure 19F:
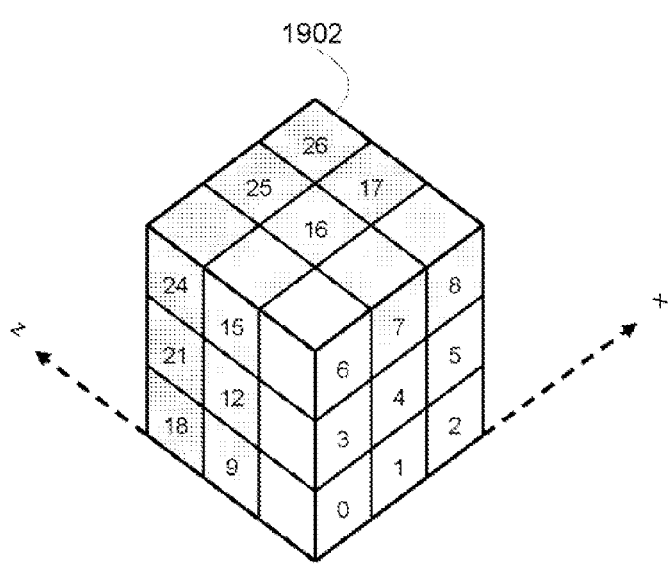

FIGS. 19A-19E provide a sequence of diagrams showing the decomposition of an initial configuration of 3D range operands into sequentially ordered, single dimension work items and subsequent dispatching in an ordered sequence to requesting processing units, according to one embodiment. Beginning with FIG. 19A, there is illustrated a 3×3×3, three (3) dimensional work set arranged in an x,y,z configuration (i.e., having x, y, and z directional indices). The 3D work set comprises 27 total operands, which are numbered one through 26 in FIG. 19B to illustrate the mapping of the operands from the 3D space 1902 into the 1D array 1904 of 26 work items. As further provide by FIG. 19B, each work item corresponds to a specific 3D index space (i.e., work item 0, with index space 0,0,0 through work item 26 with index space 2,2,2). FIG. 19B thus illustrates the decomposition of the z,y,x, 3D work set (or operands 000, through 2,2,2) into a single dimension work element (array) 1902 of 26 sequentially ordered work items. FIGS. 19C-19E then illustrates the dispatching of the work items in sequential order to the requesting processors. As shown, the work items are dispatched in chunks. The GCQ logic tracks the WIR count after each dispatch and provides that WIR count to the processing unit.

In FIG. 19C, the first set of work items are reserved for execution by a single processing unit, which reserves a chunk of 10 work items from the work set (or work element). The number of available work items (i.e., the WIR count) is reduced from 27 to 17, and the WIR count indicates that 17 work items are still available for reservation by a processing unit. Once the first set of work items have been dispatched for completion, a second set are reserved for execution by a single processing unit, as illustrated by FIG. 19D. The processing unit reserves another 10 work items from the work element, starting at the location of the next sequential work item of the 17 remaining work items. The GCQ logic then reduces the WIR count showing the number of available work items from 17 to 7. As provided by FIG. 19E, the remaining seven (7) work items are then reserved for execution by a single processing unit. The processing unit may attempt to reserve another 10 work items from the work set, but only seven (7) are available to be reserved. Thus, from a work dispatching perspective and/or work scheduling perspective, across all processing units, all work items and/or chunks of work items for the same work element are dispatched in a same ascending or descending order. At this point in the execution of the work set, all available work items have been consumed.

Depending on the number of approved processing units, the above reservations may occur in sequence or in a near simultaneous manner. For example, with a single processing unit executing all 27 of the work items, the second and third reservation of work items may occur only once the single processing unit has completed executing the previous chunk of work items. In an alternate embodiment, in which multiple processing units operate simultaneously and are contenting for work from the GCQ, the GCQ may schedule the three chunks of reserved work items for simultaneous completion on each of the processing units that reserved one of the chunks of work items.

During the above described ND Range decomposition process, all the processing units in a multi-processor implementation utilize the same ordering sequence/scheme for scheduling work across the multiple processing units. According to one embodiment, the ordering is computed using the ND-Range's dimensions (e.g. 3×3×3) and the single dimension (1D) sequence number (e.g. 26). When retrieving work items for processing from the single dimension array of re-configured work items within work element in the GCQ, each processing unit only needs to keep track of the work remaining (WIR) count that was decremented from the work element and the number of elements the particular processing unit needs to execute (i.e., the processing unit's chunk size). The GCQ logic then only needs to maintain the WIR count for each work element. The chunk size may be tailored to the target processing unit depending on static characteristics or collected heuristics. Communicating and scheduling is more efficiently managed through the use of a reserved range from the single dimension work element in the GCQ.

Figure 20:
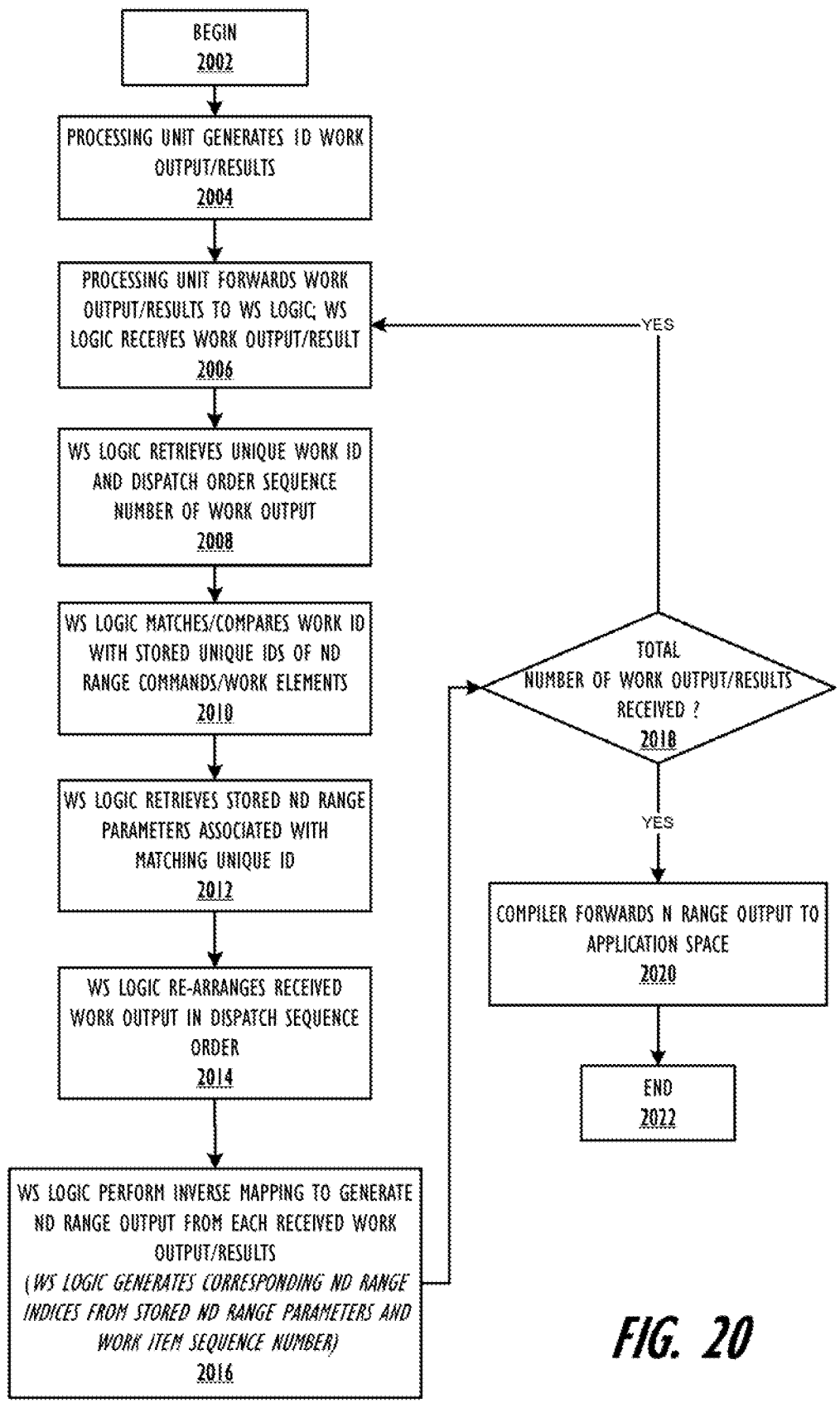
FIG. 20 is a flow chart of the generation/re-composition of a multi-dimensional range output from the single dimension work output generated from the execution of a corresponding, single dimension work element, according to one embodiment.

Referring now to FIG. 20, there is illustrated a flow chart of one method by which WS logic 1600 performs the generation/re-composition of single dimension work output results from a series of individual work items executed by one or more processing units as described above. The method begins at initiation block 2000 and proceeds to block 2004 at which processing units generate work output results from execution of work items from a work element within the GCQ. At block 2006, the processing units executing the work items retrieved from GCQ forwards the work output/results to WS logic, which receives the individual single dimension work output/results from the processing units in no particular order. Because several different processing units execute the work items, and the work items are completed in no particular order relative to each other, across the different approved processing units, the order in which the work output/results are returned may be out of sequence from their dispatch order. Thus, the return of the work/output results does not necessarily follow the sequential order in which the work items are dispatched.

At block 2008, WS logic retrieves the unique work ID (unique ID) and the dispatch order sequence number (e.g., 26, 25, 24, ... , or 0) associated with the particular work output/results. In one embodiment, these parameters are embedded within the work output/results. WS logic then locates the matching set of ND range parameters in storage by comparing (and matching) the work ID from within the work output/results with the unique ID of the ND Range command, as indicated at block 2010. A match of the work ID with the unique ID identifies the specific ND Range work set that was decomposed to create the single dimension array of work items. At block 2012, WS logic retrieves from persistent storage all of the other parameters related to the command/work element from which the work output/results were generated. In the illustrative embodiment, using the sequence order from the work output/results, WS logic re-arranges the work output results in the sequential order (of the work items), as shown at block 2014. With the work output/results arranged in the correct ordered sequence, WS logic initiates a second algorithm which provides an inverse mapping of the one dimensional array of work output/results into a corresponding 3D range output, as indicated at block 2016. The second algorithm is thus an inverse algorithm of the first algorithm utilized to decompose the ND range work set.

One example of the second algorithm is now provided, according to one embodiment, in which a 3D range of operands are arranged with a 4×4×2 configuration of 32, 3D range operands. When decomposing the 3D Range work set, WS logic tracks the order in which the dimensions are decomposed (e.g., x, then y, then z) and stored this ordering information for later use during the re-composition process. In an embodiment in which the x, y, and z indices follow the traditional geometric directions, the x dimension represents the row in a first plane, the y dimension represents the column in the same first plane, and the z direction represents the vertical/horizontal direction perpendicular to the first plane. Each xy plane in the z direction is described herein as a slice, such that the z direction provides slice 0 and slice 1, in the present example. When a work output/result is received, e.g., work output 22, WS logic retrieves the sequence number (22) from the work output, which number indicates that the work item which generated the work output was work item number 22 of the work element. The work element when placed in the GCQ contained work items numbered from zero (0) through 31, which were dispatched in that sequentially order. Each work item was then tagged with its specific sequential number, and that number is embedded within the corresponding work output/result.

In order to index work output 22 into its proper 3D position from the original 3D configuration, the algorithm first determines the direction of the last slice used during decomposition (i.e., which dimension was last used to break the indexed operands (x,y,z) out of the 3D configuration). With the z direction determined, the algorithm then multiplies the sizes of each other direction with each other to generate a first argument. Thus, assume, for example, that the 4×4×2 work set was decomposed (with sequential operands assigned) in the x, then y, then z direction, with z being of size 2, and x and y of sizes 4. Then, during re-composition, the WS logic or the second algorithm divides the sequence number (22) by 16 (4 multiplied by 4) to find to which slice of z operands (slice 0 or slice 1) to map the particular work output (corresponding to the slice of the operand that generated the work item with sequence number 22). Thus, the z slice is determined as: 22 divided by 16, which yields whole number result one (1) with remainder 6. The whole number portion of the result (i.e., 1) indicates the z slice is slice 1.

The remainder is then divided by the size of the next decomposed dimension (y) to find the y column in slice 1 of the z dimension. Thus, the algorithm computes the y column as: six (6) divided by four (4), which yields second whole number result one (1), with remainder two (2). The one (1) indicates that the y position is in the second y column in the second z slice. Also, the remainder, two (2) then indicates the x row position in that particular y column. Thus, utilizing the second algorithm, WS logic is able to re-composed the ND Range output, with work output 22 mapped into the position with indices 2,1,1 (in terms of row, column, slice). It is understood that different algorithms or methods may be provided to enable the re-composition process, and all such algorithms/method fall within the equivalents of the described embodiment.

In one alternate embodiment, rather than first re-arranging the work output/results in sequential order, WS logic automatically determines, via a third algorithm, the ND range index (e.g., x, y, z) corresponding to the dispatch order sequence number within each received work output/result. WS logic generates the corresponding ND Range output utilizing the stored ND Range indices, the sequence ordering information, and the total number of initially generated work items. As the work results are received, WS logic tracks the number of work results received, and compares the number against the previously stored total work items count, as shown at decision block 2018. When WS logic has received the total number of work results, i.e., the expected number of work results generated from the ND range operands and/or corresponding dispatched work items, WS logic stops monitoring for additional output/results for the specific work element/ND Range command. WS logic is able to halt further monitoring and mapping of results because there is an exact relationship (one-to-one or other known ratio) between the number of operands and number of work items dispatched versus the number of work output/results generated. As each work output/result is received, WS logic also detects the sequence number of the work result, corresponding to the number in the sequence of work items that were dispatched. For example, in a work element having 16 work items, work result 16 corresponds to first dispatched work item 16, while work result seven (7) corresponds to sequentially dispatched work item 7, which is dispatched after work item 8 and before work item 6, or together with other work items if in the same chunk of work items being dispatched to a processing node or processing unit.

While described as a one-to-one mapping herein, other embodiments provide for a single operand and/or work item to each generate multiple work output/results. In these alternate embodiments, WS logic would apply a pre-determined multiplier (M, for a one-to-M input versus output relationship) for each work item. The result of the multiplication of M with the total number of operands/work items provides a second "total number of outputs for mapping" parameter used to track completion of the inverse mapping function that is implemented to generate the ND Range output. Alternatively, WS logic may also store the multiplier (M) as one of the parameters of the ND Range command (or work element), and then apply the multiplier only during the re-composition process to determine when re-composition of the ND Range output is complete. With the total number of work results accounted for, WS logic is able to re-construct the ND Range output, as if the processing units had operated on the ND Range data set rather than the substantially simpler, single dimension data array.

Returning to decision block 2018, when the total number of work output/results have been mapped into the ND Range output, WS logic passes the ND Range output to the application space to which the work results is to be provided, as shown at block 2020. Notably, the ND Range output presented is exactly the same output that would have been generated using a conventional ND Range execution paradigm in which the actual ND range indices are tracked throughout the entire execution sequence to account for the specific individual position of (a) each operand and (b) each corresponding result in the ND range. However, the ND Range output provided by the present described embodiments is generated with substantially reduced usage of processing and memory resources, which would otherwise have been required to track the N-dimensional indices with (a) each operand and (b) each operation and (c) each generated work result, as required by conventional ND Range processing. The process of FIG. 20 ends at block 2022.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As provided herein, the embodiments describe a method, computer system, and an article of manufacture (or computer program product) for efficient dispatch/completion of an N Dimensional (ND) Range command. The method comprises: a compiler generating one or more commands from received program instructions, wherein said one or more commands are utilized by a runtime scheduler to schedule work for execution on one or more processing units within the data processing system; ND Range work processing (WP) logic associated with the compiler determining when a command generated by the compiler will be implemented over an ND Range of operands that are arranged in an N dimensional configuration, where N is greater than one (1); when N is greater than one (1), automatically decomposing the ND Range of operands into a one (1) dimension work element comprising P sequentially ordered work items that each represent, within the one dimensional work element, one of the ND Range of operands; placing the single dimension work element within one or more entries of a command queue of the data processing system, wherein each of the one or more entries holds a 1D array of work items in an ordered sequence; and enabling sequential dispatch of the 1D array of work items from the command queue to the one or more processing units, wherein the 1D array of work items are dispatched for execution in the ordered sequence.

In one embodiment, the automatically decomposing the ND Range of operands into a one (1) dimension work element further comprises: selecting a first mapping order for re-arranging the ND Range of operands, which order is provided by a first logic/algorithm for decomposing ND Range of operands, wherein said first mapping order is a pre-programmed first order; utilizing the first mapping order, dynamically mapping each operand from the ND Range to a 1D index location within the single dimension array of the work element; tagging the work element with an indication of the first mapping order utilized to create the single dimension array from the ND Range. The automatically decomposing the ND Range of operands into a one (1) dimension work element further comprises: determining a numerical size of each dimension within the ND Range, wherein a first numerical size represents a total number of operands in a first dimension of the N dimensions; representing the numerical size of each dimension in an index format having each numerical size presented in sequence; calculating a total number of operands within the ND Range of operands; and storing the total number and the index format within a persistent storage of the data processing system.

In yet another embodiment, calculating a total number of operands within the ND Range of operands comprises multiplying the numerical size of each dimension with each other and subtracting any index space within the ND Range that does not include an operand. Further, in one embodiment, the method further comprises: providing a unique identification (ID) for the command; associating the unique ID to one or more stored parameters of the command, including the total number and index format and a mapping order; storing the unique ID along with the one or more stored parameters; and assigning the unique ID to each work item of the work element; detecting the unique ID from within a single dimension work output result corresponding to a single dimension work item of the single dimension work element dispatched to the one or more processing units for execution; retrieving from the persistent storage, the ND Range parameters associated with the unique ID; and generating an ND Range output from multiple of the single dimension work output result utilizing a second algorithm which factors in the total number, index format, and first mapping order from the first algorithm.

In another embodiment, the method comprises: responsive to receipt from the one or more processing units of a single dimension work output result corresponding to a single dimension work item of the single dimension work element dispatched to the one or more processing units for execution, the ND Range WP logic generating an ND Range output by mapping the received single dimension work output result to an ND position corresponding to an original location of the ND Range operand represented by the single dimension work item.

The command queue is a global command queue of a multi-node, data processing system. The method further comprises: providing each processing unit to which a work item of the single dimension work element is dispatched with the unique ID of the work item; enabling each processing unit to retrieve the sequentially ordered work items of the single dimension work element in correct sequential order to maintain an ordered dispatch and tracking sequence relative to a mapping from the ND Range operations; and enabling each processing unit to tagged each work output result generated by executing the work item with the unique ID and information identifying the correct sequential order; sequentially dispatching each work item as one item within a chunk of sequential work items, wherein the chunk of sequential work items are dispatched as a first sized chunk for low latency processing nodes and a larger second chunk size for high latency processing nodes; automatically tracking a number of work items remaining within the work element; forwarding to a first processing unit to which a first chunk of work items is dispatched a first count of work items remaining, which is utilized along with a first chunk size to determine which work items are dispatched to the first processing unit; decrementing the work items remaining by the first chunk size to generate a second count which is forwarded to a next processing unit to which a second chunk of work items are dispatched; and forwarding the unique ID of the command to the first processing unit and subsequent processing units to which the work items are dispatched.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system, a method for efficient dispatch/completion of an N Dimensional (ND) Range command, said method comprising:

a compiler generating one or more commands from received program instructions, wherein said one or more commands are utilized by a runtime scheduler to schedule work for execution on one or more processing units within the data processing system;

ND Range work scheduling (WS) logic associated with the compiler determining when a command generated by the compiler will be implemented over an ND Range of operands that are arranged in an N dimensional configuration, where N is greater than one;

in response to N being greater than one, automatically decomposing the ND Range of operands into a one (1) dimension work element comprising P sequentially ordered work items that each represent, within the one dimensional work element, one of the ND Range of operands;

placing the single dimension work element within one or more entries of a command queue of the data processing system, wherein each of the one or more entries holds a 1D array of work items in an ordered sequence; and enabling sequential dispatch of the 1D array of work items from the command queue to the one or more processing units, wherein the 1D array of work items are dispatched for execution in the ordered sequence.

2. The method of claim 1, wherein said automatically decomposing the ND Range of operands into a one dimension work element further comprises:

selecting a first mapping order for re-arranging the ND Range of operands, which order is provided by a first logic/algorithm for decomposing ND Range of operands, wherein said first mapping order is a pre-programmed first order;

utilizing the first mapping order, dynamically mapping each operand from the ND Range to a location within the single dimension array of the work element; and tagging the work element with an indication of the first mapping order utilized to create the single dimension array from the ND Range.

3. The method of claim 1, wherein said automatically decomposing the ND Range of operands into a one dimension work element further comprises:

determining a numerical size of each dimension within the ND Range, wherein a first numerical size represents a total number of operands in a first dimension of the N dimensions;

representing the numerical size of each dimension in an index format having each numerical size presented in sequence;

calculating a total number of operands within the ND Range of operands; and storing the total number and the index format within a persistent storage of the data processing system.

4. The method of claim 3, wherein said calculating a total number of operands within the ND Range of operands comprises multiplying the numerical size of each dimension with each other and subtracting any index space within the ND Range that does not include an operand.

5. The method of claim 3, further comprising:

providing a unique identification (ID) for the command;

associating the unique ID to one or more stored parameters of the command, including the total number and index format and a mapping order;

storing the unique ID along with the one or more stored parameters; and assigning the unique ID to the work element and to each work item dispatched from the work element.

6. The method of claim 5, further comprising:

detecting the unique ID from within a single dimension work output result corresponding to a single dimension work item of the single dimension work element dispatched to the one or more processing units for execution;

retrieving from the persistent storage, the ND Range parameters associated with the unique ID; and generating an ND Range output from multiple of the single dimension work output result utilizing a second algorithm which factors in the total number, index format, and first mapping order from the first algorithm.

7. The method of claim 1, further comprising:

responsive to receipt from the one or more processing units of a single dimension work output result corresponding to a single dimension work item of the single dimension work element dispatched to the one or more processing units for execution, the ND Range WP logic generating an ND Range output by mapping the received single dimension work output result to an ND position corresponding to an original location of the ND Range operand represented by the single dimension work item.

8. The method of claim 5, wherein:

the command queue is a global command queue of a multi-node, data processing system; and the method further comprises:

providing each processing unit to which a work item of the single dimension work element is dispatched with the unique ID of the work item;

enabling each processing unit to retrieve the sequentially ordered work items of the single dimension work element in correct sequential order to maintain an ordered dispatch and tracking sequence relative to a mapping from the ND Range operations; and enabling each processing unit to tagged each work output result generated by executing the work item with the unique ID and information identifying the correct sequential order.

9. The method of claim 8, further comprising:

sequentially dispatching each work item as one item within a chunk of sequential work items, wherein the chunk of sequential work items are dispatched as a first sized chunk for low latency processing nodes and a larger second chunk size for high latency processing nodes;

automatically tracking a number of work items remaining within the work element;

forwarding to a first processing unit to which a first chunk of work items is dispatched a first count of work items remaining, which is utilized along with a first chunk size to determine which work items are dispatched to the first processing unit;

decrementing the work items remaining by the first chunk size to generate a second count which is forwarded to a next processing unit to which a second chunk of work items are dispatched; and forwarding the unique ID of the command to the first processing unit and subsequent processing units to which the work items are dispatched.

* * * * *